US012432716B2

(12) United States Patent
Tian et al.

(10) Patent No.: US 12,432,716 B2
(45) Date of Patent: Sep. 30, 2025

(54) DYNAMIC RECONFIGURATION OF UPLINK CONTROL CHANNEL RESOURCES FOR A SCHEDULING REQUEST

(71) Applicant: QUALCOMM Incorporated, San Diego, CA (US)

(72) Inventors: Qingjiang Tian, San Diego, CA (US); Xiaoxia Zhang, San Diego, CA (US); Jing Sun, San Diego, CA (US); Zhifei Fan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/219,079

(22) Filed: Mar. 31, 2021

(65) Prior Publication Data
US 2022/0322385 A1    Oct. 6, 2022

(51) Int. Cl.
*H04W 72/23*    (2023.01)
*H04W 72/1268*    (2023.01)

(52) U.S. Cl.
CPC ....... *H04W 72/1268* (2013.01); *H04W 72/23* (2023.01)

(58) Field of Classification Search
CPC ......... H04W 72/1268; H04W 72/1289; H04W 72/20; H04W 72/02; H04B 7/0617; H04L 5/0023; H04L 5/0053; H04L 5/0094
See application file for complete search history.

(56) References Cited

U.S. PATENT DOCUMENTS

| | | | |
|---|---|---|---|
| 2018/0368173 A1* | 12/2018 | Shaheen | H04W 72/23 |
| 2020/0314858 A1 | 10/2020 | Xu et al. | |
| 2020/0314860 A1* | 10/2020 | Zhou | H04W 72/042 |
| 2022/0116939 A1* | 4/2022 | Mukherjee | H04W 72/1284 |
| 2022/0217760 A1* | 7/2022 | Iyer | H04L 5/003 |
| 2022/0232544 A1 | 7/2022 | Bai et al. | |
| 2022/0256562 A1* | 8/2022 | Behravan | H04W 72/1268 |
| 2022/0353892 A1* | 11/2022 | Cirik | H04L 5/0096 |

(Continued)

FOREIGN PATENT DOCUMENTS

| | | | |
|---|---|---|---|
| EP | 3927061 A1 | 12/2021 | |
| GB | 2545916 A * | 7/2017 | H04L 5/0053 |
| WO | WO-2020164640 A1 | 8/2020 | |

(Continued)

OTHER PUBLICATIONS

International Search Report and Written Opinion—PCT/US2022/016824—ISA/EPO—Jun. 30, 2022.

*Primary Examiner* — Marcus Smith
*Assistant Examiner* — Zhaohui Yang
(74) *Attorney, Agent, or Firm* — Holland & Hart / QUALCOMM Incorporated

(57) ABSTRACT

Methods, systems, and devices for wireless communications are described. In a wireless communications system, a user equipment (UE) may receive a first downlink control message indicating a set of parameters for a scheduling request for the UE. The UE may then receive on a receive beam a second downlink control message, which may be a layer 1 signal, and determine uplink resources for the scheduling request and a transmission configuration indicator state for the scheduling request. The UE may transmit, to the base station, the scheduling request using the uplink resources.

26 Claims, 16 Drawing Sheets

(56) References Cited

U.S. PATENT DOCUMENTS

| | | | |
|---|---|---|---|
| 2023/0209647 A1* | 6/2023 | Khoshkholgh Dashtaki | ............... H04W 72/232 |
| 2023/0292335 A1* | 9/2023 | Park | ..................... H04B 7/0404 |

FOREIGN PATENT DOCUMENTS

| WO | WO 2022259543 | * | 6/2021 | ............ H04W 76/19 |
|---|---|---|---|---|
| WO | WO-2022259543 A1 | * | 12/2022 | |

* cited by examiner

DYNAMIC RECONFIGURATION OF UPLINK CONTROL CHANNEL RESOURCES FOR A SCHEDULING REQUEST

FIELD OF TECHNOLOGY

The following relates to wireless communications, including dynamic reconfiguration of uplink control channel resources for a scheduling request.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic reconfiguration of uplink control channel resources for a scheduling request and a transmission configuration (TCI) state for a user equipment (UE). Generally, the described techniques enable a base station to dynamically reconfigure a physical uplink control channel (PUCCH) resource(s) for a scheduling request and a TCI state through Layer 1 (L1) signaling (e.g., downlink control information (DCI)). In some examples, the base station may use radio resource control (RRC) signaling to configure one or multiple PUCCH resources for a scheduling request for the UE, where each PUCCH resource may be associated with one TCI state. The base station may transmit DCI to indicate (e.g., activate or deactivate) one of the PUCCH resources for the scheduling request and the corresponding TCI state. For example, the DCI may indicate a scheduling request PUCCH resource identifier or scheduling request identifier to activate one of the configured PUCCH resources for the scheduling request and the associated TCI state, and the UE may use the activated PUCCH resources for transmitting a scheduling request to the base station.

In some aspects, the base station may configure some long-term properties for a scheduling request via RRC and transmit DCI to dynamically indicate a PUCCH resource for the scheduling request and the TCI state. The RRC configuration may include parameters such as a scheduling request identifier, a periodicity or an offset, or any combination thereof. The DCI may indicate a selected resource (e.g., using a scheduling request PUCCH resource identifier) and an associated TCI state. In some cases, the UE may determine that the DCI is a scheduling request activation DCI based on a radio network temporary identifier (RNTI) of the DCI. The RNTI may be a scheduling request-specific RNTI or a configured scheduling RNTI with one or more bits used to indicate that the DCI is for scheduling request activation. The UE may provide feedback for the scheduling request activation DCI using resources indicated by the DCI.

A method for wireless communication at a UE is described. The method may include receiving, from a base station, a first downlink control message indicating a set of parameters for a scheduling request for the UE, receiving, from the base station using a receive beam, a second downlink control message for the scheduling request, determining, based on the first downlink control message and the second downlink control message, uplink resources for the scheduling request and a TCI state, and transmitting, to the base station using the TCI state, the scheduling request using the uplink resources based on the set of parameters for the scheduling request.

An apparatus for wireless communication at a UE is described. The apparatus may include a processor, memory coupled with the processor, and instructions stored in the memory. The instructions may be executable by the processor to cause the apparatus to receive, from a base station, a first downlink control message indicating a set of parameters for a scheduling request for the UE, receive, from the base station using a receive beam, a second downlink control message for the scheduling request, determine, based on the first downlink control message and the second downlink control message, uplink resources for the scheduling request and a TCI state, and transmit, to the base station using the TCI state, the scheduling request using the uplink resources based on the set of parameters for the scheduling request.

Another apparatus for wireless communication at a UE is described. The apparatus may include means for receiving, from a base station, a first downlink control message indicating a set of parameters for a scheduling request for the UE, means for receiving, from the base station using a receive beam, a second downlink control message for the scheduling request, means for determining, based on the first downlink control message and the second downlink control message, uplink resources for the scheduling request and a TCI state, and means for transmitting, to the base station using the TCI state, the scheduling request using the uplink resources based on the set of parameters for the scheduling request.

A non-transitory computer-readable medium storing code for wireless communication at a UE is described. The code may include instructions executable by a processor to receive, from a base station, a first downlink control message indicating a set of parameters for a scheduling request for the UE, receive, from the base station using a receive beam, a second downlink control message for the scheduling request, determine, based on the first downlink control message and the second downlink control message, uplink resources for the scheduling request and a TCI state, and transmit, to the base station using the TCI state, the scheduling request using the uplink resources based on the set of parameters for the scheduling request.

In some examples of the method, apparatuses, and non-transitory computer-readable medium described herein, receiving the first downlink control message may include operations, features, means, or instructions for receiving a layer 3 control message that configures a set of multiple configurations for the scheduling request, a set of multiple uplink resources including the uplink resources and a set of multiple TCI states including the second TCI state; each of the set of multiple configurations may be associated with one of the set of multiple uplink resources and one of the set of multiple TCI states.

In some examples of the method, apparatuses, and non-transitory computer-readable medium described herein, receiving the second downlink control message may include operations, features, means, or instructions for receiving a layer 1 control message that activates a configuration of the set of multiple configurations for the scheduling request, the configuration may be associated with the uplink resources and the second TCI state.

In some examples of the method, apparatuses, and non-transitory computer-readable medium described herein, the layer 3 control message indicates, for each of the set of multiple uplink resources, a scheduling request uplink resource identifier, a number of symbols, a number of resource blocks, a starting symbol index, or any combination thereof.

In some examples of the method, apparatuses, and non-transitory computer-readable medium described herein, the layer 3 control message indicates, for each of the set of multiple configurations, a scheduling request identifier, a periodicity, an offset, a scheduling request timer, a number of maximum transmissions allowed for the scheduling request, or any combination thereof.

In some examples of the method, apparatuses, and non-transitory computer-readable medium described herein, receiving the first downlink control message may include operations, features, means, or instructions for receiving a layer 3 control message indicating a scheduling request identifier, a periodicity, an offset, a scheduling request timer, a number of maximum transmissions allowed for the scheduling request, or any combination thereof, for configuration for the scheduling request.

In some examples of the method, apparatuses, and non-transitory computer-readable medium described herein, receiving the second downlink control message may include operations, features, means, or instructions for receiving a layer 1 control message that includes the scheduling request identifier, an identifier for a set of uplink control channel resources, and the second TCI state where the uplink resources include the set of uplink control channel resources.

In some examples of the method, apparatuses, and non-transitory computer-readable medium described herein, the identifier for the set of uplink control channel resources indicates a number of symbols, a number of resource blocks, a starting symbol index, or any combination thereof associated with the set of uplink control channel resources.

In some examples of the method, apparatuses, and non-transitory computer-readable medium described herein, receiving the second downlink control message may include operations, features, means, or instructions for decoding the second downlink control message based on an RNTI unique to the scheduling request.

In some examples of the method, apparatuses, and non-transitory computer-readable medium described herein, receiving the second downlink control message may include operations, features, means, or instructions for decoding the second downlink control message based on a configured scheduling (CS) RNTI, where the second downlink control message includes one or more bits that indicate activation of a configuration for the scheduling request.

Some examples of the method, apparatuses, and non-transitory computer-readable medium described herein may further include operations, features, means, or instructions for transmitting feedback for the second downlink control message using the uplink resources indicated by the second downlink control message.

A method for wireless communication at a base station is described. The method may include transmitting, to a UE, a first downlink control message indicating a set of parameters for a scheduling request for the UE, transmitting, to the UE using a first beam, a second downlink control message for the scheduling request, where one or both of the first downlink control message and the second downlink control message indicate uplink resources for the scheduling request and a second TCI state, and receiving, from the UE, the scheduling request on the uplink resources based on the set of parameters for the scheduling request.

An apparatus for wireless communication at a base station is described. The apparatus may include a processor, memory coupled with the processor, and instructions stored in the memory. The instructions may be executable by the processor to cause the apparatus to transmit, to a UE, a first downlink control message indicating a set of parameters for a scheduling request for the UE, transmit, to the UE using a first beam, a second downlink control message for the scheduling request, where one or both of the first downlink control message and the second downlink control message indicate uplink resources for the scheduling request and a second TCI state, and receive, from the UE, the scheduling request on the uplink resources based on the set of parameters for the scheduling request.

Another apparatus for wireless communication at a base station is described. The apparatus may include means for transmitting, to a UE, a first downlink control message indicating a set of parameters for a scheduling request for the UE, means for transmitting, to the UE using a first beam, a second downlink control message for the scheduling request, where one or both of the first downlink control message and the second downlink control message indicate uplink resources for the scheduling request and a second TCI state, and means for receiving, from the UE, the scheduling request on the uplink resources based on the set of parameters for the scheduling request.

A non-transitory computer-readable medium storing code for wireless communication at a base station is described. The code may include instructions executable by a processor to transmit, to a UE, a first downlink control message indicating a set of parameters for a scheduling request for the UE, transmit, to the UE using a first beam, a second downlink control message for the scheduling request, where one or both of the first downlink control message and the second downlink control message indicate uplink resources for the scheduling request and a second TCI state, and receive, from the UE, the scheduling request on the uplink resources based on the set of parameters for the scheduling request.

In some examples of the method, apparatuses, and non-transitory computer-readable medium described herein, transmitting the first downlink control message may include operations, features, means, or instructions for transmitting a layer 3 control message that configures a set of multiple configurations for the scheduling request, a set of multiple uplink resources including the uplink resources and a set of multiple TCI states including the second TCI state; each of the set of multiple configurations may be associated with one of the set of multiple uplink resources and one of the set of multiple TCI states.

In some examples of the method, apparatuses, and non-transitory computer-readable medium described herein, transmitting the second downlink control message may include operations, features, means, or instructions for transmitting a layer 1 control message that activates a configuration of the set of multiple configurations for the scheduling request, the configuration may be associated with the uplink resources and the second TCI state.

In some examples of the method, apparatuses, and non-transitory computer-readable medium described herein, the layer 3 control message indicates, for each of the set of multiple uplink resources, a scheduling request uplink resource identifier, a number of symbols, a number of resource blocks, a starting symbol index, or any combination thereof.

In some examples of the method, apparatuses, and non-transitory computer-readable medium described herein, the layer 3 control message indicates, for each of the set of multiple configurations, a scheduling request identifier, a periodicity, an offset, a scheduling request timer, a number of maximum transmissions allowed for the scheduling request, or any combination thereof.

In some examples of the method, apparatuses, and non-transitory computer-readable medium described herein, transmitting the first downlink control message may include operations, features, means, or instructions for transmitting a layer 3 control message indicating a scheduling request identifier, a periodicity, an offset, a scheduling request timer, a number of maximum transmissions allowed for the scheduling request, or any combination thereof, for configuration for the scheduling request.

In some examples of the method, apparatuses, and non-transitory computer-readable medium described herein, transmitting the second downlink control message may include operations, features, means, or instructions for transmitting a layer 1 control message that includes the scheduling request identifier, an identifier for a set of uplink control channel resources, and the second TCI state, where the uplink resources include the set of uplink control channel resources.

In some examples of the method, apparatuses, and non-transitory computer-readable medium described herein, the identifier for the set of uplink control channel resources indicates a number of symbols, a number of resource blocks, a starting symbol index, or any combination thereof associated with the set of uplink control channel resources.

In some examples of the method, apparatuses, and non-transitory computer-readable medium described herein, transmitting the second downlink control message may include operations, features, means, or instructions for transmitting the second downlink control message based on an RNTI unique to the scheduling request.

In some examples of the method, apparatuses, and non-transitory computer-readable medium described herein, transmitting the second downlink control message may include operations, features, means, or instructions for transmitting the second downlink control message based on a CS RNTI, where the second downlink control message includes one or more bits that indicate activation of a configuration for the scheduling request.

Some examples of the method, apparatuses, and non-transitory computer-readable medium described herein may further include operations, features, means, or instructions for receiving feedback for the second downlink control message using the uplink resources indicated by the second downlink control message.

DETAILED DESCRIPTION

Figure 1:
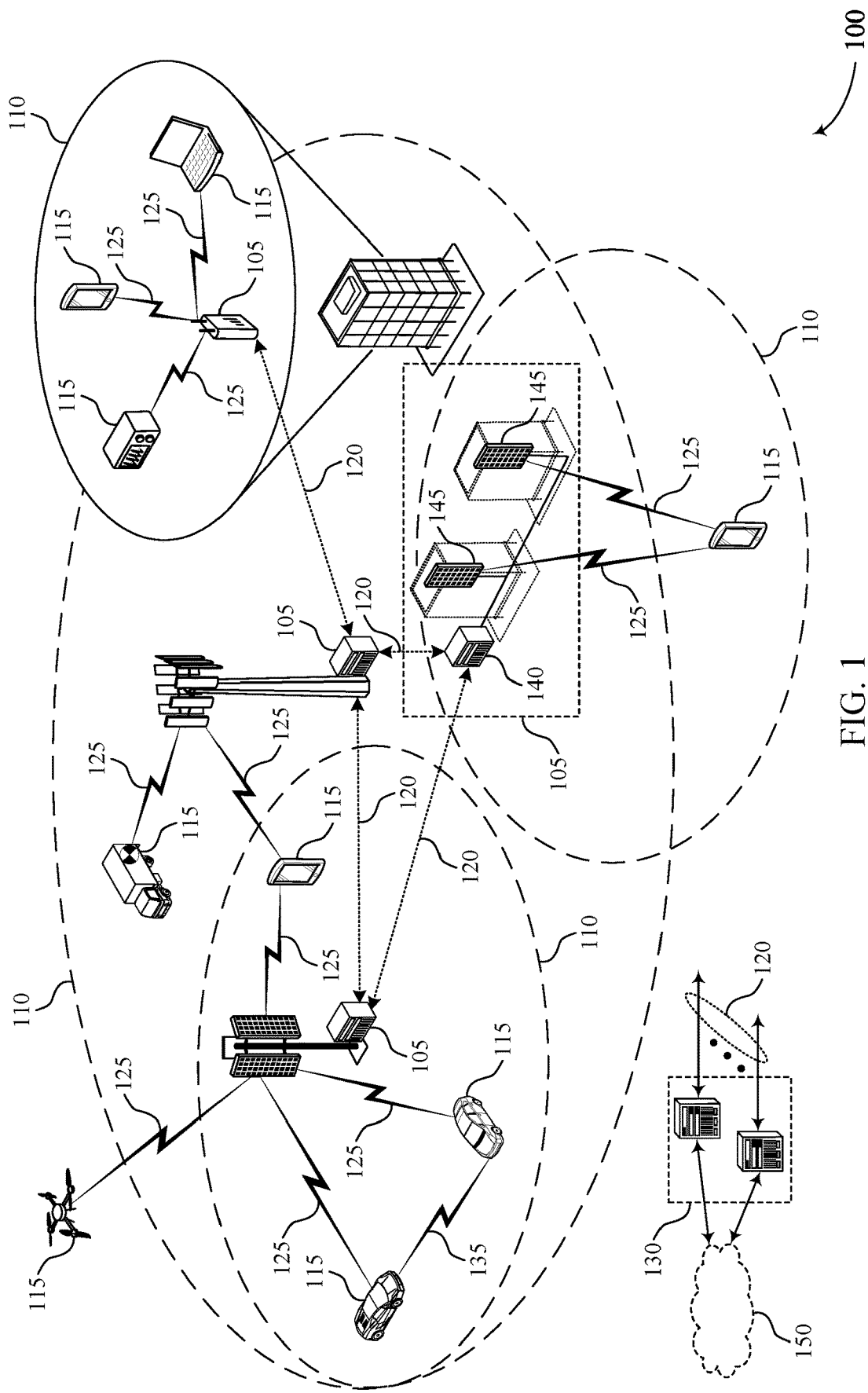
FIG. 1 illustrates an example of a wireless communications system that supports aspects of the present disclosure.

In some wireless communications systems, a user equipment (UE) may transmit a scheduling request to request a resource allocation for an uplink data transmission to a base station. In some systems, the base station may configure one uplink resource for a scheduling request configuration for the UE using radio resource control (RRC) signaling. If the UE moves to a different location, the base station may change the transmission configuration indicator (TCI) state for the UE, as a new beam may be more suitable to receive the scheduling request from the UE. However, in some cases, two or more UEs may be initially on a same beam with scheduling request resources frequency division multiplexed (FDMed) on the same symbol. If one UE moves to a different location corresponding to a different beam (e.g., with a different TCI state), the base station may switch both the beam and uplink resources for the scheduling request for the UE. If the base station only switches the beam (e.g., the TCI state) for the UE, the base station may not support reception on two different beams at the same time and may therefore be unable to receive scheduling requests from both UEs using different beams in the same symbol without reconfiguring an uplink scheduling request resource to a different time location for one of the UEs. Using Layer 3 (L3) signaling, such as RRC signaling, to reconfigure the uplink resource, however, may be slow, which may increase latency and reduce efficiency. In some cases, the base station may use RRC to configure more than one scheduling request resource and send a medium access control (MAC) control element (CE) (e.g., Layer 2 (L2) signaling) to select (e.g., activate or deactivate) one of the resources. L2 signaling, however, may not be quick enough for some dynamic or mobility scenarios, which may result in delayed or missed scheduling request transmissions. As such, it may be beneficial to quickly and concurrently reconfigure both the uplink resource for the scheduling request and the TCI state.

Techniques described herein support dynamically reconfiguring an uplink resource for a scheduling request and a TCI state through Layer 1 (L1) signaling, such as downlink control information (DCI). In some cases, the base station may use RRC signaling (e.g., L3 signaling) to configure multiple scheduling request configurations, each with a corresponding uplink resource for a scheduling request. The base station may use DCI to select (e.g., activate or deactivate) one of the scheduling request configurations and uplink resources. In some cases, each configuration may include parameters such as a scheduling request identifier, a periodicity or an offset, a scheduling request physical uplink control channel (PUCCH) resource identifier, an associated TCI state, or any combination thereof. The DCI may indicate a scheduling request PUCCH resource identifier or scheduling request identifier to select a configured uplink resource for a scheduling request and the associated TCI state, thereby dynamically updating the uplink resource for the scheduling request and the TCI state at the same time.

In some cases, the base station may use RRC to configure some long-term properties for a scheduling request configuration, and DCI may dynamically indicate a PUCCH resource for the scheduling request and the TCI state. The RRC configuration may include parameters such as a scheduling request identifier, a periodicity and an offset, scheduling request timer information, a maximum number of scheduling request transmissions, or any combination thereof. The DCI may indicate a PUCCH resource (e.g., using a scheduling request PUCCH resource identifier) and an associated TCI state.

Some additional aspects are described herein to support the dynamic reconfiguration of uplink resources used for a scheduling request and a TCI state of the UE. In some cases, the UE may determine the DCI is a scheduling request-activation DCI based on a radio network temporary identifier (RNTI) used to scramble a cyclic redundancy check (CRC) of the DCI. The RNTI used for this DCI may be a scheduling request-specific RNTI or based on a configured scheduling RNTI. For example, one bit of a DCI encoded by the configured scheduling RNTI may be set to indicate that the DCI is used for scheduling request resource activation. The UE may provide feedback for the scheduling request-activating DCI using uplink resources indicated by the DCI.

Aspects of the disclosure are initially described in the context of wireless communications systems. Aspects are also described with respect to a process flow. Aspects of the disclosure are further illustrated by and described with reference to apparatus diagrams, system diagrams, and flowcharts that relate to dynamic reconfiguration of uplink control channel resources for a scheduling request.

FIG. 1 illustrates an example of a wireless communications system 100 that supports dynamic reconfiguration of uplink control channel resources for a scheduling request in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a CRC), forward error correction (FEC), and retransmission (e.g., automatic repeat request (ARID)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may send a scheduling request to request a resource allocation for an uplink data transmission to a base station 105. The base station 105 may configure the UE 115 with a scheduling request configuration using RRC signaling. In some cases, the base station 105 may assign each logical channel one PUCCH resource. Each logical channel may be associated with a scheduling request identifier (e.g., schedulingRequestID), and based on the scheduling request identifier, the logical channel may point to one entry in a configuration table (e.g., SchedulingRequestResourceconfig). In some cases, inside the table entry, an element (e.g., PUCCH-ResourceId) may point to a given (e.g., static) PUCCH resource for a scheduling request configuration.

The UE 115 and base station 105 may communicate using beamformed communications. For example, the base station 105 configure a TCI state for the UE 115, the TCI state corresponding to one of multiple different beams. In some cases, the beam may be associated with a synchronization signal block (SSB) (e.g., SSB1, SSB2). If the UE 115 moves to a different location, the base station 105 may change the TCI state for the UE 115, as a new beam may be more suitable to receive the scheduling request from the UE 115. For example, the UE 115 may move from a first beam associated with SSB1 to a second beam associated with SSB2, and the base station 105 may change the TCI state for the UE 115 from a first TCI state associated with SSB1 to a second TCI state associated with SSB2.

In some cases, two or more UEs 115 may be initially on the same beam (e.g., associated with SSB1) with scheduling request resources FDMed on the same symbol. If one UE 115 moves to different location with a different beam (e.g., a different TCI state), the base station 105 may change both the beam and corresponding PUCCH resources for the beam. For example, the base station 105 may change the TCI state for one UE 115 and may also change the PUCCH resource for the scheduling request for one of the UEs 115, as the base station 105 may not be able to receive on two different beams at the same time. For example, a base station 105 using analog beamforming may not be capable of receiving using two beams simultaneously. As such, the base station 105 may be unable to receive scheduling requests from both UEs 115 without reconfiguring a PUCCH resource for one of the UEs 115 so that the scheduling requests are sent using different time domain resources. However, using RRC signaling to reconfigure the PUCCH resource may be slow, which may increase latency and reduce efficiency. The wireless communications system 100, and other wireless communications systems described herein, may implement techniques to concurrently change a PUCCH resource for a scheduling request and a TCI state for a UE 115.

In some systems, a base station 105 may use RRC signaling to configure more than one scheduling request resource and a MAC-CE (e.g., Layer 2 (L2) signaling) for selection (e.g., activation or deactivation) of one of the resources. In cases where two or more UEs 115 may be initially on the same beam with scheduling request resources FDMed on the same symbol, the base station 105 may configure more than one scheduling request resource and may use MAC-CE (e.g., L2 signaling) to activate a particular resource. Thus, the base station 105 may use RRC to configure more than one scheduling request resource and use MAC-CE to activate of one of the resources. However, L2 signaling may still be slower than L1 signaling, which may result in delayed or missed scheduling request transmissions.

The wireless communications system 100 may support L1 signaling, such as DCI, to dynamically change a PUCCH resource for a scheduling request and a TCI state for a UE 115. For example, a base station 105 may dynamically reconfigure a PUCCH resource for a scheduling request and a TCI state through DCI for the UE 115. In some cases, the base station 105 may use RRC signaling to configure multiple PUCCH resources for multiple scheduling request configurations. The base station 105 may use DCI to select (e.g., activate or deactivate) one of the PUCCH resources and one TCI state. In some cases, each scheduling request configuration for a scheduling request resource may include parameters such as a scheduling request identifier, a periodicity and an offset, a scheduling request prohibit timer, a number of scheduling request transmissions (e.g., a maximum number of scheduling request transmissions), a scheduling request PUCCH resource identifier, an associated TCI state, or any combination thereof. The DCI may indicate a scheduling request PUCCH resource identifier or scheduling request identifier to activate a configured PUCCH resource for a scheduling request. In this example, multiple PUCCH resources with different TCI states may be configured by RRC signaling, and the base station 105 may send DCI to dynamically select one of the PUCCH resources corresponding to the new TCI state for the UE 115. This may configure scheduling request resources for UEs 115 on different beams in non-overlapping resources in the time domain, as the base station 105 may dynamically update the scheduling request resource for one of the UEs 115.

In some cases, the base station 105 may use RRC to configure some long-term properties for a scheduling request, and DCI may dynamically indicate a PUCCH resource for the scheduling request and a TCI state. The RRC configuration may include parameters such as a scheduling request identifier, a periodicity and an offset, a scheduling request prohibit timer, a number of scheduling request transmissions, or any combination thereof. The DCI may indicate a selected uplink resource for the scheduling request (e.g., using a scheduling request PUCCH resource identifier) and an associated TCI state. For example, the DCI may indicate a number of symbols, a number of RBs, a starting symbol index, or any combination thereof, for the scheduling request PUCCH resources.

In some cases, the UE 115 may determine the DCI is a scheduling request activation DCI based on an RNTI. In some cases, an RNTI used to encode the DCI may be a scheduling request specific RNTI. For example, the RNTI may be a scheduling request-RNTI. In some other examples, a configured scheduling RNTI may be used to encode the scheduling request-activation DCI, and the scheduling request-activation DCI may include one bit to indicate that the DCI is used for scheduling request activation. For example, the one bit may distinguish the scheduling request-activation DCI from a DCI used to activate a configured grant (CG).

Figure 2:
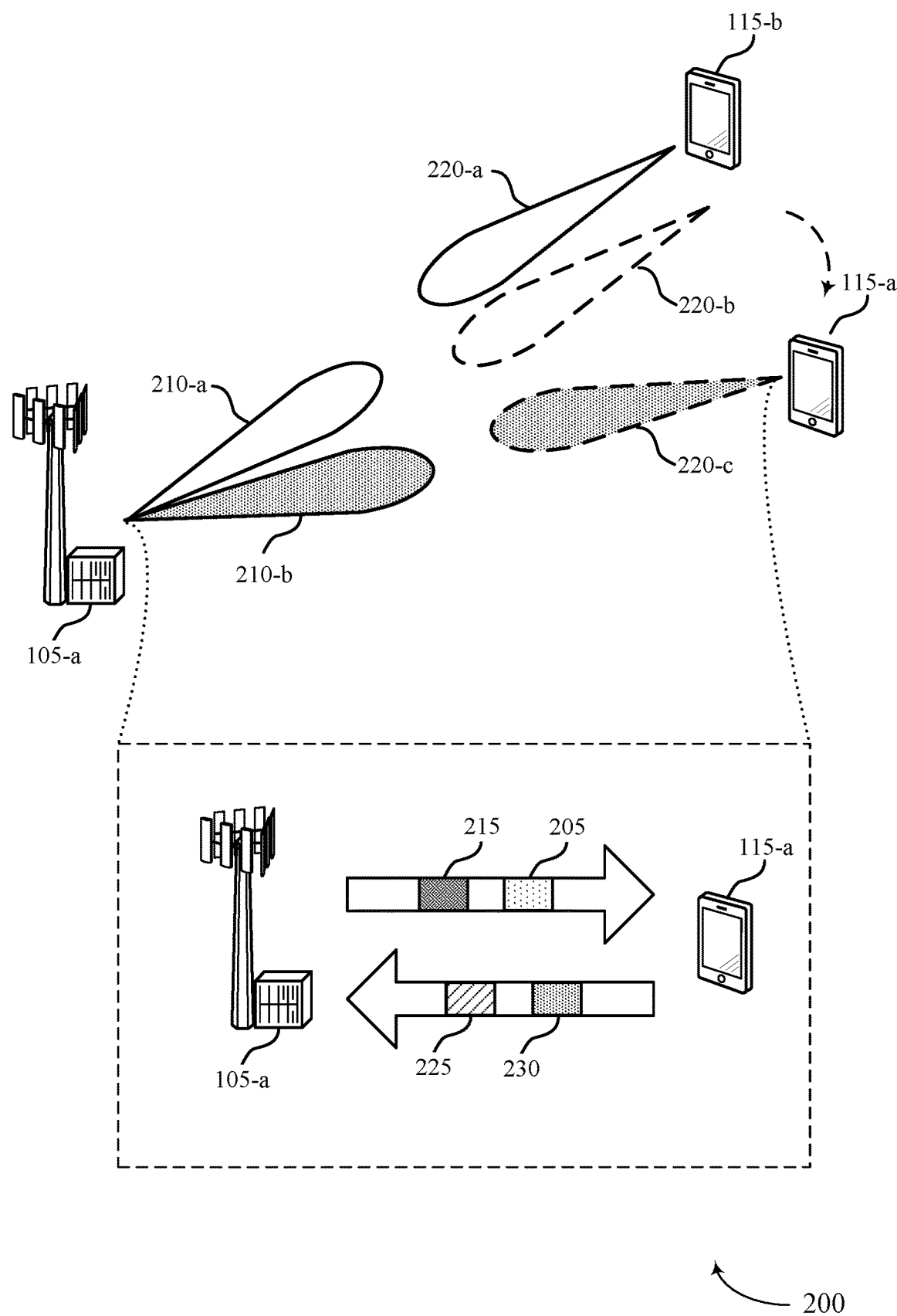
FIG. 2 illustrates an example of a wireless communications system that supports aspects of the present disclosure.

FIG. 2 illustrates an example of a wireless communications system 200 that supports dynamic reconfiguration of uplink control channel resources for a scheduling request and a TCI state in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, and a base station 105-a. The base station 105 and the UEs 115 may be examples of corresponding devices described herein with reference to FIG. 1.

In some examples, the base station 105-a may communicate with the UE 115-a and the UE 115-b using beamformed transmissions over pairs of beams, including beams 210 and beams 220. In some cases, each beam 210 may be associated with a separate SSB and have an associated TCI state. In some cases, two or more UEs 115 (e.g., the UE 115-a and the UE 115-b) may be initially on the same beam with scheduling request resources FDMed on the same symbol. For example, the base station 105-a may transmit to the UEs 115 using the beam 210-a (e.g., associated with SSB1). The UE 115-b may receive the downlink transmissions using the beam 220-a. The UE 115-a may similarly initially communicate using beam 220-b, which may have a same spatial filter as beam 220-a. Therefore, the base station 105-a may communicate with both UEs 115 using beam 210-a.

In some cases, the UE 115-a may move to a different location. Once the UE 115-a moves, the UE 115-a may communicate using a different beam (e.g., beam 220-c). The base station 105-a may use the beam 210-b with a different TCI state more suitable for communications with the beam 220-c. For example, the UE 115-a may use the beam 220-c, and the base station 105-a may use the beam 210-b (e.g., associated with SSB2).

The wireless communications system 200 may implement techniques to update both the scheduling request resource for the UE 115-a and the TCI state for the UE 115-a at the same time. Upon the UE 115-a moving, the base station 105-a may change both the beam (e.g., from the beam 210-a to the beam 210-b) and corresponding PUCCH resources for a scheduling request 225. As such, the base station 105-a may change the PUCCH resource for a scheduling request 225 and the TCI state for the UE 115-a at the same time, because the base station 105-a may not be able to receive on both the beam 210-a and the beam 210-b at the same time. In some other systems, the base station 105-a may use RRC to reconfigure the PUCCH resources for a scheduling request 225, which may be slow and increase latency and reduce efficiency in mmW.

In some cases, the base station 105-a may dynamically reconfigure a PUCCH resource for a scheduling request 225 and a TCI state through DCI (e.g., L1 signaling). For example, the base station 105-a may send a first message 205 including the RRC signaling and a second message 215 including the DCI. The base station 105-a may use RRC signaling to configure more than one PUCCH resource for a scheduling request 225 for a logical channel and may use DCI to select (e.g., activate or deactivate) one of the PUCCH resources for communications with the UE 115. In some cases, the base station 105-a may use RRC signaling to configure (e.g., pre-configure) multiple scheduling request configurations, each with a corresponding PUCCH resource and TCI state. The RRC configuration may include a scheduling request identifier (e.g., SchedulingRequestID), a periodicity and an offset (e.g., PeriodicityAndOffset), a timer for scheduling request transmission on PUCCH (e.g., SR-prohibitTimer), a maximum number of scheduling request transmissions (e.g., SR-TransMax), an associated TCI state, a scheduling request PUCCH resource identifier, or any combination thereof. In some cases, the scheduling request PUCCH resource identifier may indicate the scheduling request PUCCH resource allocation and include a number of symbols, a number of RBs, and a start symbol index, among other elements. The DCI may include the scheduling request identifier or the scheduling request PUCCH identifier, and the base station 105-a may use the DCI to re-select (e.g., activate) one of the resources using the parameters.

In some cases, the base station 105-a may use RRC to configure some long-term properties of a scheduling request configuration for a logical channel. The base station 105-a may use DCI to indicate a PUCCH resource for the scheduling request configuration and a corresponding TCI state. The RRC configuration may include a scheduling request identifier (e.g., SchedulingRequestID), a periodicity and an offset (e.g., PeriodicityAndOffset), a timer for scheduling request transmission on PUCCH (e.g., SR-prohibitTimer), a maximum number of scheduling request transmissions (e.g., SR-TransMax), or any combination thereof. The DCI may include a scheduling request PUCCH resource identifier and an associated TCI state, among other elements. In some cases, the scheduling request PUCCH resource identifier may indicate the scheduling request PUCCH resource allocation, including a number of symbols, a number of RBs, and a start symbol index, among other elements. As such, the base station 105-a may use DCI to indicate PUCCH resources for a scheduling request for a logical channel. By simultaneously reconfiguring a PUCCH resource for a scheduling request 225 and a TCI state through DCI, the base station 105-a may reduce latency for scheduling request transmissions when a UE 115 moves to a different beam. This may provide higher efficiency and lower latency the wireless communications system 200, among other benefits. For example, the UE 115-a may successfully send a scheduling request 225 faster than reconfiguring the PUCCH resources by RRC signaling or MAC-CE signaling, which may provide resources for an uplink transmission faster.

In some examples, the UE 115-a may receive a scheduling request activation from the base station 105-a via DCI. In some cases, the DCI activating a scheduling request configuration or indicating PUCCH resources for the scheduling request may be referred to as a scheduling request-activation DCI. The UEs 115 may determine the DCI is a scheduling request-activation DCI based on an RNTI used to scramble or descramble a CRC of the scheduling request-activation DCI. In some cases, the RNTI may be an RNTI specific to scheduling requests. For example, the RNTI may be a new RNTI such as a scheduling request-RNTI. In some cases, the UE 115-a may determine that the DCI is a scheduling request-activation DCI based on one or more bits included in the DCI. For example, the CRC of the DCI may be scrambled using a configured scheduled (CS) RNTI, and one bit in the DCI distinguish the scheduling request-activation DCI from another DCI (e.g., a CG-activation DCI). In some cases, the scheduling request-activation DCI may align its size with some existing DCI to reduce the amount of blind detection.

In some cases, the UE 115-a may transmit feedback 230 to the base station 105-a for the scheduling request-activation DCI. In some cases, the scheduling request-activation DCI may include a PUCCH resource indicator (PRI) field, which may indicate a PUCCH resource for the feedback 230 for the scheduling request-activation DCI.

In some examples, a UE 115 may be configured for semi-persistent resources. For example, a UE 115 may receive a CG scheduling semi-persistent uplink transmissions. The base station 105-a may configure PUSCH resources using a CG, and the UE 115 may send uplink messages to the base station 105-a using PUSCH resources configured by the CG. In some cases, there may be two different types of CG configurations (e.g., Type 1 and Type 2). For a Type 1 CG, the base station 105-*a* may use RRC to configure all parameters for the CG. Therefore, for Type 1 CG, the base station 105-*a* may not use L1 signaling (e.g., DCI) for further configuration of a Type 1 CG. For Type 2 CG, the base station 105-*a* may use RRC to configure a part of the parameters for CG use DCI (e.g., with DCI format 0_0) to configure the remaining parameters and activate the CG. In some cases, the UE 115 may use MAC-CE signaling to acknowledge the reception of the DCI activating the Type 2 CG. In some cases, Type 2 CG, which may be more flexible and faster than the Type 1 CG based on the activation through MAC-CE.

In some cases, some techniques used to improve scheduling request configuration may be applied to enhance Type 1 CG. For example, the base station 105-*a* may use RRC configuration to configure multiple resources for a Type 1 CG. In some cases, the base station 105-*a* may use DCI signaling to indicate which resource to use for the Type 1 CG (e.g., selecting one of the multiple configured resources). The DCI for Type 1 CG may include both a PUSCH resource identifier and an associated TCI state. The UE 115 may then communicate using the selected resource and associated TCI state for the Type 1 CG. These techniques may provide dynamic resource and TCI updates for a Type 1 CG. This may reduce latency for modifying a configuration for a Type 1 CG over using RRC signaling to reconfigure the Type 1 CG.

Figure 3:
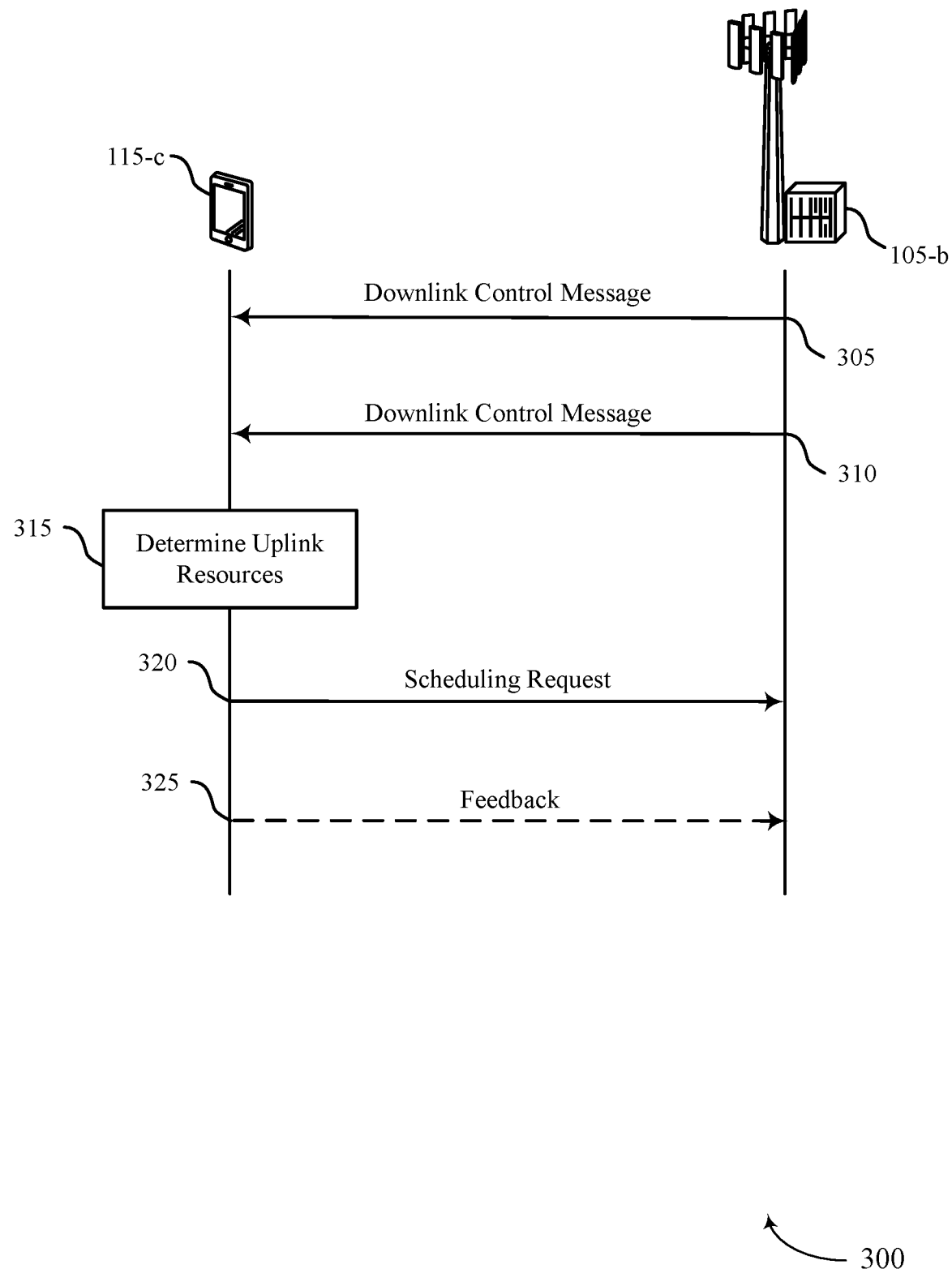
FIG. 3 illustrates an example of a process flow that supports aspects of the present disclosure.

FIG. 3 illustrates an example of a process flow 300 that supports dynamic reconfiguration of uplink control channel resources for a scheduling request in accordance with aspects of the present disclosure. The process flow 300 may implement aspects of wireless communications systems 100 and 200 or may be implemented by aspects of the wireless communications system 100 and 200. The base station 105-*b* and the UE 115-*c* may be examples of a base station 105 and a UE 115, as described with reference to FIGS. 1 and 2. In the following description of the process flow 300, the signaling between the base station 105-*b* and the UE 115-*c* may be transmitted in a different order than the example order shown, or the operations performed by the base station 105-*b* and the UE 115-*c* may be performed in different orders or at different times. Some operations may also be omitted from the process flow 300, and other operations may be added to the process flow 300.

The process flow 300 may generally describe dynamically indicating a PUCCH resource for a scheduling request and an associated TCI state at the same time. The process flow 300 may implement one or more techniques for dynamically indicating the PUCCH resource and TCI state via DCI signaling.

At 305, the UE 115-*c* may receive, from the base station 105-*b*, a first downlink control message indicating a set of parameters for a scheduling request for the UE 115-*c*. For example, the UE 115-*c* may receive an RRC control message (e.g., L3 signaling) from the base station 105-*b* that configures parameters for the scheduling request.

In a first example, the UE 115-*c* may receive the L3 control message that configures a set of multiple configurations for the scheduling request, a set of multiple uplink resources, and a set of multiple TCI states, where each configuration of the set of multiple configurations is associated with one of the uplink resources of the set of multiple uplink resources and one TCI state of the set of multiple TCI states. In some cases, the L3 control message may indicate, for each configuration of the set of multiple configurations, a scheduling request identifier, a periodicity and an offset, a scheduling request timer, a number of maximum transmissions allowed for the scheduling request, or any combination thereof. In the first example, the L3 control message may indicate, for each uplink resource of the set of multiple uplink resources, a scheduling request PUCCH resource identifier, a number of symbols, a number of RBs, and a start symbol index, an associated spatial relation state, or any combination thereof.

In a second example, the UE 115-*c* may receive an L3 control message that configures long-term parameters for a scheduling request configuration, and PUCCH resources for the scheduling request may be dynamically indicated to the UE 115-*c* using DCI at 310. The parameters configured by the L3 control message may be used for the PUCCH resources which are indicated by L1 control message. For example, the UE 115-*c* may receive an L3 control message indicating a scheduling request identifier, a periodicity and offset, a scheduling request timer, a number of maximum number of transmissions allowed for the scheduling request, or any combination thereof, for the configuration for the scheduling request.

At 310, the UE 115-*c* may receive, from the base station 105-*b* using a receive beam, a second downlink control message for the scheduling request. For the first example, the UE 115-*c* may receive DCI (e.g., L1 signaling) that activates a configuration of the set of multiple scheduling request configurations for the scheduling request, where the configuration is associated with uplink resources and a TCI state. The DCI may include the scheduling request identifier or the scheduling request PUCCH identifier, and the base station 105-*b* may use the DCI to re-select (e.g., activate) one of the resources using the parameters. Therefore, at 310 for the first example, the PUCCH resources may be dynamically activated from a set of multiple preconfigured PUCCH resources corresponding to multiple different pre-configured scheduling request configurations. In some cases, a new TCI state may also be activated together with the activated PUCCH resource.

At 310 for the second example, the UE 115-*c* may receive, from the base station 105-*b*, an L1 control message that includes a scheduling request identifier, an identifier for a set of uplink control channel resources, and a TCI state. For the second example, the identifier for the set of uplink control channel resources may include a number of symbols, a number of RBs, a starting symbol index, or any combination thereof, associated with the set of uplink control channel resources. Therefore, for the second example, the uplink resources for the scheduling request may be dynamically configured at the UE 115-*c*. In the second example, the uplink resources indicated by the L1 control message may use the scheduling request configuration indicated by the L3 signaling at 305.

In some cases, the UE 115-*c* may determine that the L1 control message is a scheduling request-activation DCI based on an RNTI used to encode the L1 control message. For example, the UE 115-*c* may decode the second downlink control message based part on an RNTI unique to the scheduling request. For example, a CRC of the second downlink control message may be encoded with a scheduling request-RNTI. In another example, the UE 115-*c* may decode the second downlink control message based on a configured scheduling RNTI. In some cases, the second downlink control message includes one or more bits that indicate activation of a configuration for the scheduling request. In some cases, the one or more bits in the DCI may differentiate. the scheduling request-activation DCI from a CG-activation DCI if the CRC of the DCI is encoded with a configured scheduling RNTI.

At 315, the UE 115-*c* may determine, based on the first downlink control message and the second downlink control message, uplink resources for the scheduling request and a TCI state. The TCI state may be associated with the UE 115-*c*, such as being associated with a beam pointing in a spatial direction of the UE 115-*c* after the UE 115-*c* changes position.

At 320, the UE 115-*c* may transmit, to the base station 105-*b*, the scheduling request using the uplink resources based on the set of parameters for the scheduling request. In some cases, the UE 115-*c* may transmit the scheduling request according to the RRC configured parameters and DCI selection of the scheduling request PUCCH resources. In some examples, the UE 115-*c* may transmit the scheduling request using a spatial filter that is based on the TCI state determined at 315.

In some cases, at 325, the UE 115-*c* may transmit, to the base station 105-*b*, feedback for the second control message using second uplink resources indicated by the second downlink control message. In some cases, the UE 115-*c* may transmit feedback that the UE 115-*c* received a scheduling request-activation DCI.

Figure 4:
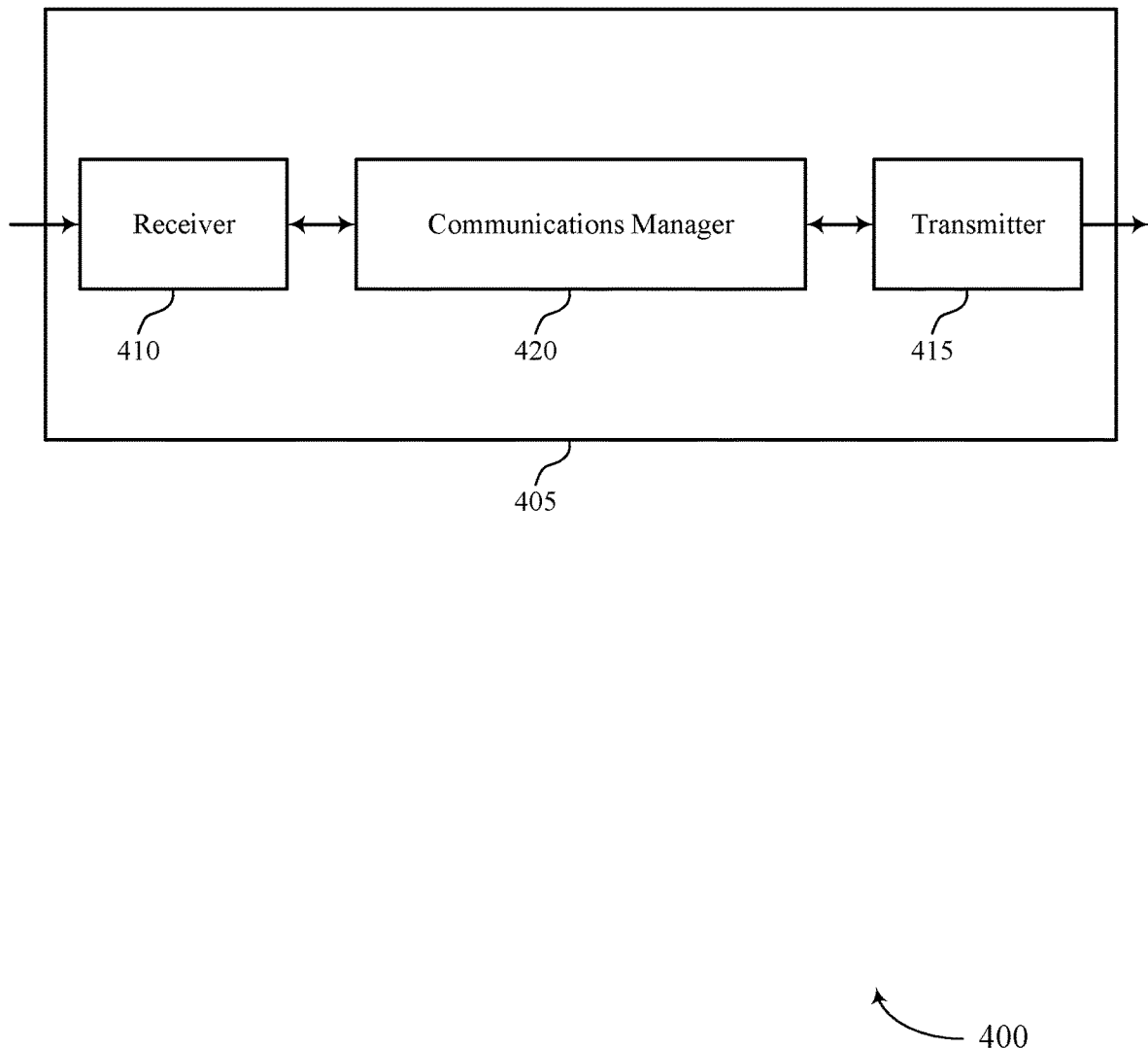
FIGS. 4 and 5 show block diagrams of devices that support aspects of the present disclosure.

FIG. 4 shows a block diagram 400 of a device 405 that supports dynamic reconfiguration of uplink control channel resources for a scheduling request in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to dynamic reconfiguration of uplink control channel resources for a scheduling request). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to dynamic reconfiguration of uplink control channel resources for a scheduling request). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of dynamic reconfiguration of uplink control channel resources for a scheduling request as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a first downlink control message indicating a set of parameters for a scheduling request for the UE. The communications manager 420 may be configured as or otherwise support a means for receiving, from the base station using a receive beam, a second downlink control message for the scheduling request. The communications manager 420 may be configured as or otherwise support a means for determining, based on the first downlink control message and the second downlink control message, uplink resources for the scheduling request and a transmission configuration indicator state. The communications manager 420 may be configured as or otherwise support a means for transmitting, to the base station using the transmission configuration indicator state, the scheduling request using the uplink resources based on the set of parameters for the scheduling request.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for dynamically reconfiguring a PUCCH resource for a scheduling request and a TCI state through L1 signaling, which may improve reliability and resource efficiency and decrease latency, among other advantages. As such, techniques described herein may promote network efficiencies by decreasing the time for preparation and transmission of a scheduling request when switching beams or TCI states.

Figure 5:
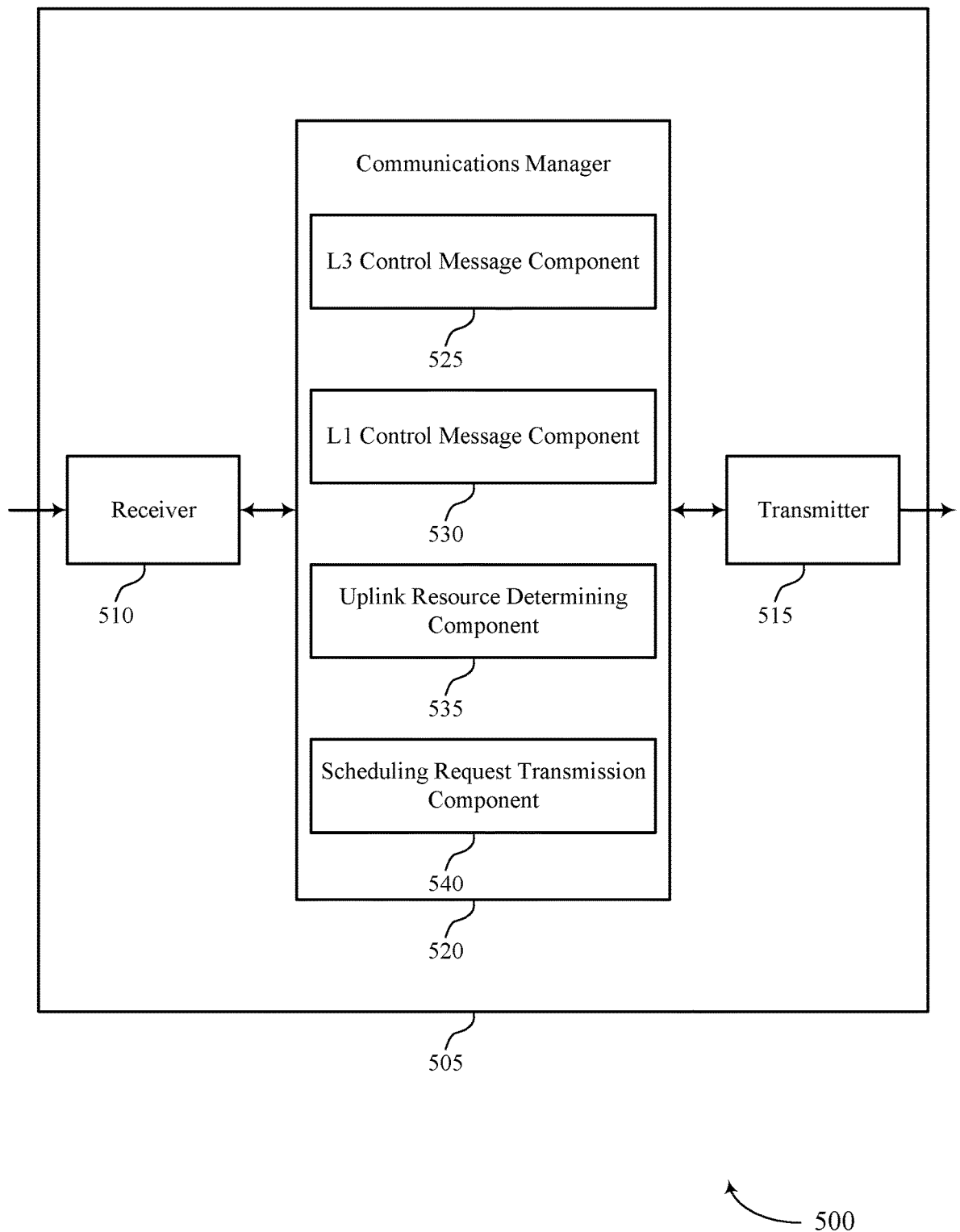

FIG. 5 shows a block diagram 500 of a device 505 that supports dynamic reconfiguration of uplink control channel resources for a scheduling request in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic reconfiguration of uplink control channel resources for a scheduling request). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic reconfiguration of uplink control channel resources for a scheduling request). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of dynamic reconfiguration of uplink control channel resources for a scheduling request as described herein. For example, the communications manager 520 may include a L3 control message component 525, a L1 control message component 530, an uplink resource determining component 535, a scheduling request transmission component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The L3 control message component 525 may be configured as or otherwise support a means for receiving, from a base station, a first downlink control message indicating a set of parameters for a scheduling request for the UE. The L1 control message component 530 may be configured as or otherwise support a means for receiving, from the base station using a receive beam, a second downlink control message for the scheduling request. The uplink resource determining component 535 may be configured as or otherwise support a means for determining, based on the first downlink control message and the second downlink control message, uplink resources for the scheduling request and a transmission configuration indicator state. The scheduling request transmission component 540 may be configured as or otherwise support a means for transmitting, to the base station using the transmission configuration indicator state, the scheduling request using the uplink resources based on the set of parameters for the scheduling request.

Figure 6:
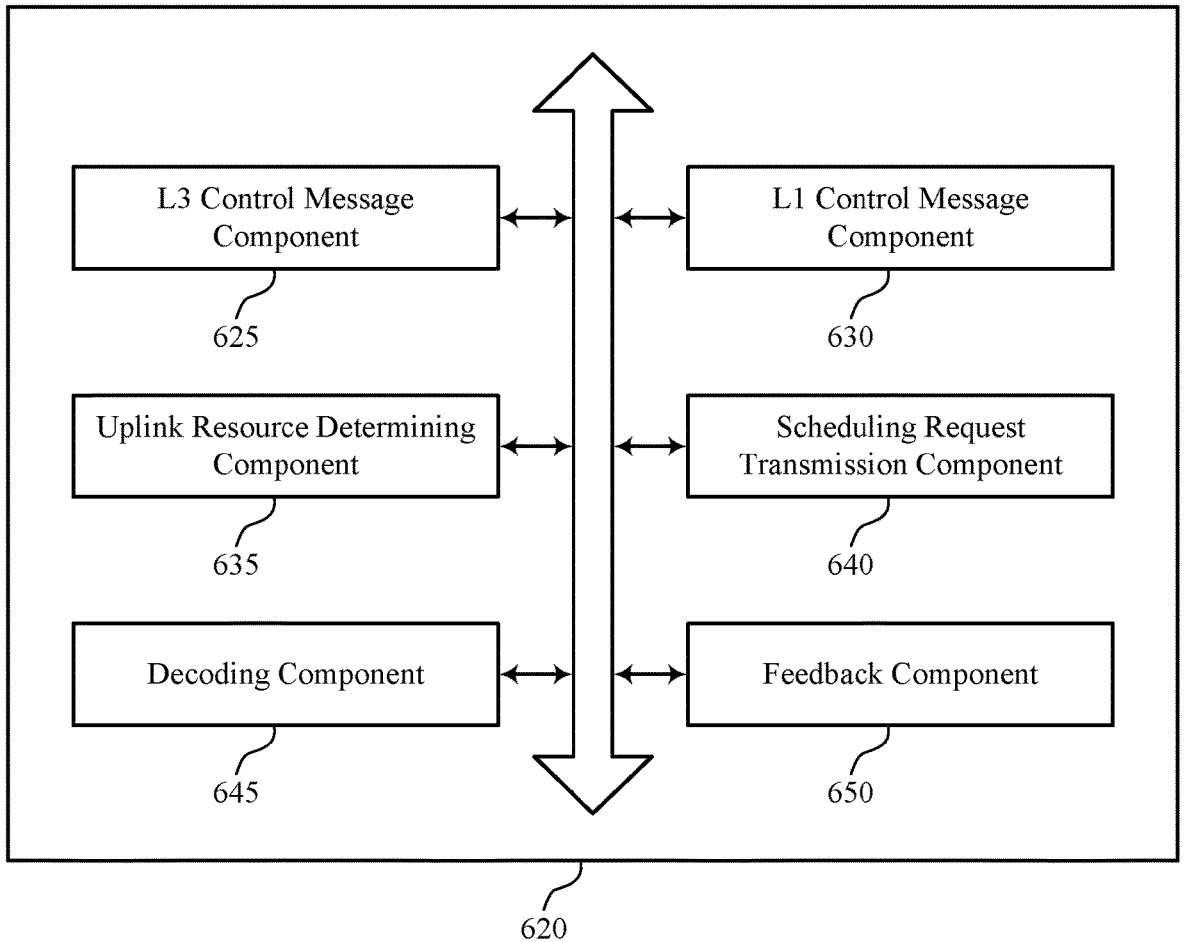
FIG. 6 shows a block diagram of a communications manager that supports aspects of the present disclosure.

FIG. 6 shows a block diagram 600 of a communications manager 620 that supports dynamic reconfiguration of uplink control channel resources for a scheduling request in accordance with aspects of the present disclosure. The communications manager 620 may be an example of aspects of a communications manager 420, a communications manager 520, or both, as described herein. The communications manager 620, or various components thereof, may be an example of means for performing various aspects of dynamic reconfiguration of uplink control channel resources for a scheduling request as described herein. For example, the communications manager 620 may include a L3 control message component 625, a L1 control message component 630, an uplink resource determining component 635, a scheduling request transmission component 640, a decoding component 645, a feedback component 650, or any combination thereof. Each of these components may communicate, directly or indirectly, with one another (e.g., via one or more buses).

The communications manager 620 may support wireless communication at a UE in accordance with examples as disclosed herein. The L3 control message component 625 may be configured as or otherwise support a means for receiving, from a base station, a first downlink control message indicating a set of parameters for a scheduling request for the UE. The L1 control message component 630 may be configured as or otherwise support a means for receiving, from the base station using a receive beam, a second downlink control message for the scheduling request. The uplink resource determining component 635 may be configured as or otherwise support a means for determining, based on the first downlink control message and the second downlink control message, uplink resources for the scheduling request and a transmission configuration indicator state. The scheduling request transmission component 640 may be configured as or otherwise support a means for transmitting, to the base station using the transmission configuration indicator state, the scheduling request using the uplink resources based on the set of parameters for the scheduling request.

In some examples, to support receiving the first downlink control message, the L3 control message component 625 may be configured as or otherwise support a means for receiving a layer 3 control message that configures a set of multiple configurations for the scheduling request, a set of multiple uplink resources including the uplink resources, and a set of multiple TCI states including the TCI state, where each of the set of multiple configurations is associated with one of the set of multiple uplink resources and one of the set of multiple TCI states.

In some examples, to support receiving the second downlink control message, the L1 control message component 630 may be configured as or otherwise support a means for receiving a layer 1 control message that activates a configuration of the set of multiple configurations for the scheduling request, where the configuration is associated with the uplink resources and the TCI state.

In some examples, the layer 3 control message indicates, for each of the set of multiple uplink resources, a scheduling request uplink resource identifier, a number of symbols, a number of RBs, a starting symbol index, or any combination thereof.

In some examples, the layer 3 control message indicates, for each of the set of multiple configurations, a scheduling request identifier, a periodicity, an offset, a scheduling request timer, a number of maximum transmissions allowed for the scheduling request, or any combination thereof.

In some examples, to support receiving the first downlink control message, the L3 control message component 625 may be configured as or otherwise support a means for receiving a layer 3 control message indicating a scheduling request identifier, a periodicity, an offset, a scheduling request timer, a number of maximum transmissions allowed for the scheduling request, or any combination thereof, for the scheduling request.

In some examples, to support receiving the second downlink control message, the L1 control message component 630 may be configured as or otherwise support a means for receiving a layer 1 control message that includes the scheduling request identifier, an identifier for a set of uplink control channel resources, and an indicator for the transmission configuration indicator state, where the uplink resources include the set of uplink control channel resources.

In some examples, the identifier for the set of uplink control channel resources indicates a number of symbols, a number of RBs, a starting symbol index, or any combination thereof associated with the set of uplink control channel resources.

In some examples, to support receiving the second downlink control message, the decoding component 645 may be configured as or otherwise support a means for decoding the second downlink control message based on an RNTI unique to the scheduling request.

In some examples, to support receiving the second downlink control message, the decoding component 645 may be configured as or otherwise support a means for decoding the second downlink control message based on a CS-RNTI, where the second downlink control message includes one or more bits that indicate activation of a configuration for the scheduling request.

In some examples, the feedback component 650 may be configured as or otherwise support a means for transmitting feedback for the second downlink control message using the uplink resources indicated by the second downlink control message.

Figure 7:
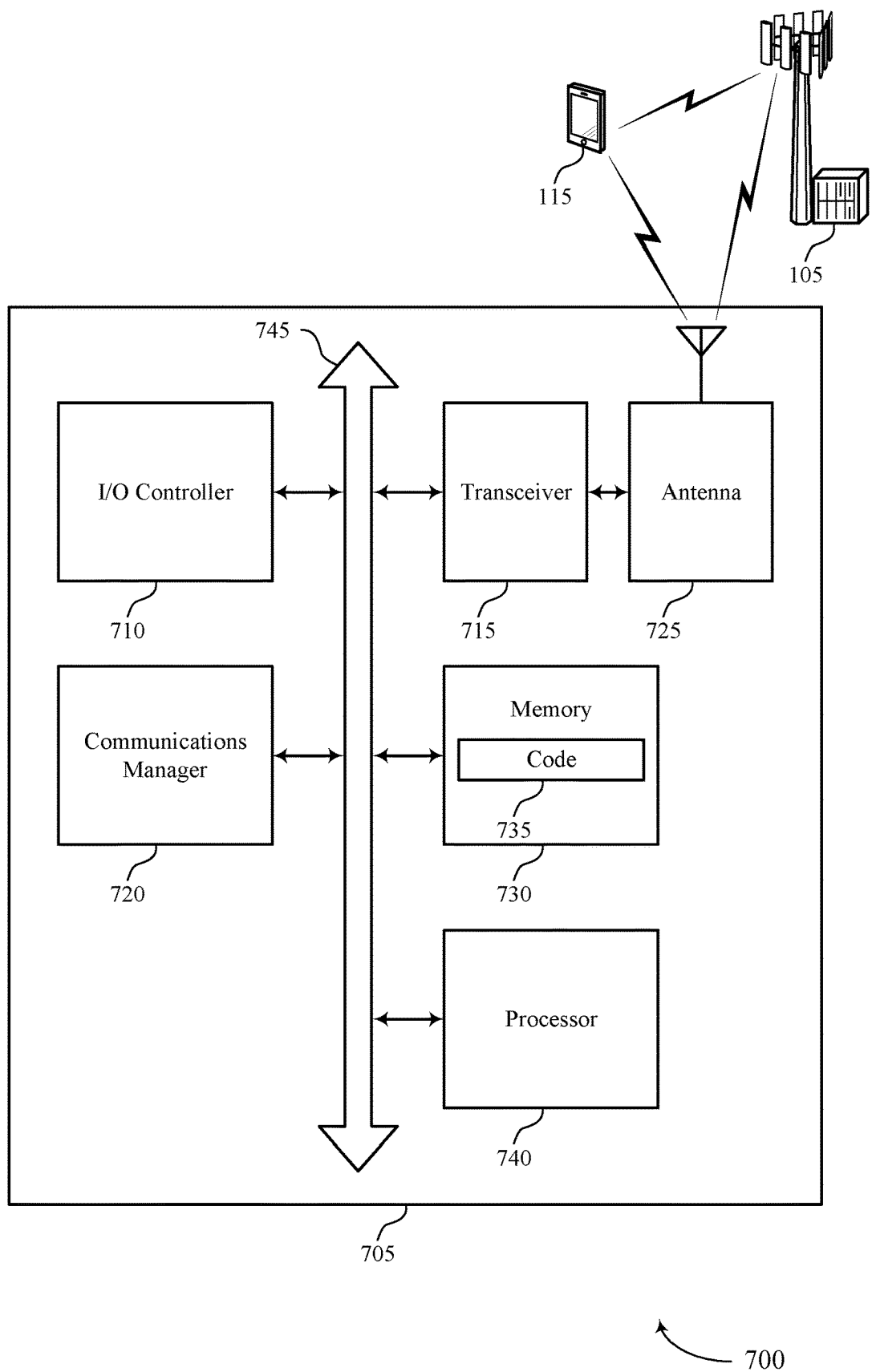
FIG. 7 shows a diagram of a system including a device that supports aspects of the present disclosure.

FIG. 7 shows a diagram of a system 700 including a device 705 that supports dynamic reconfiguration of uplink control channel resources for a scheduling request in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting dynamic reconfiguration of uplink control channel resources for a scheduling request). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a first downlink control message indicating a set of parameters for a scheduling request for the UE. The communications manager 720 may be configured as or otherwise support a means for receiving, from the base station using a receive beam, a second downlink control message for the scheduling request. The communications manager 720 may be configured as or otherwise support a means for determining, based on the first downlink control message and the second downlink control message, uplink resources for the scheduling request and a transmission configuration indicator state. The communications manager 720 may be configured as or otherwise support a means for transmitting, to the base station using the transmission configuration indicator state, the scheduling request using the uplink resources based on the set of parameters for the scheduling request.

By including or configuring the communications manager 720 in accordance with examples as described herein, the device 705 may support techniques for dynamically reconfiguring and a PUCCH resource for a scheduling request and a TCI state through L1 signaling, which may improve reliability and resource efficiency and decrease latency among other advantages. As such, techniques described herein may promote network efficiencies by increasing scheduling request transmission speeds.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of dynamic reconfiguration of uplink control channel resources for a scheduling request as described herein, or the processor 740 and the memory 730 may be otherwise configured to perform or support such operations.

Figure 8:
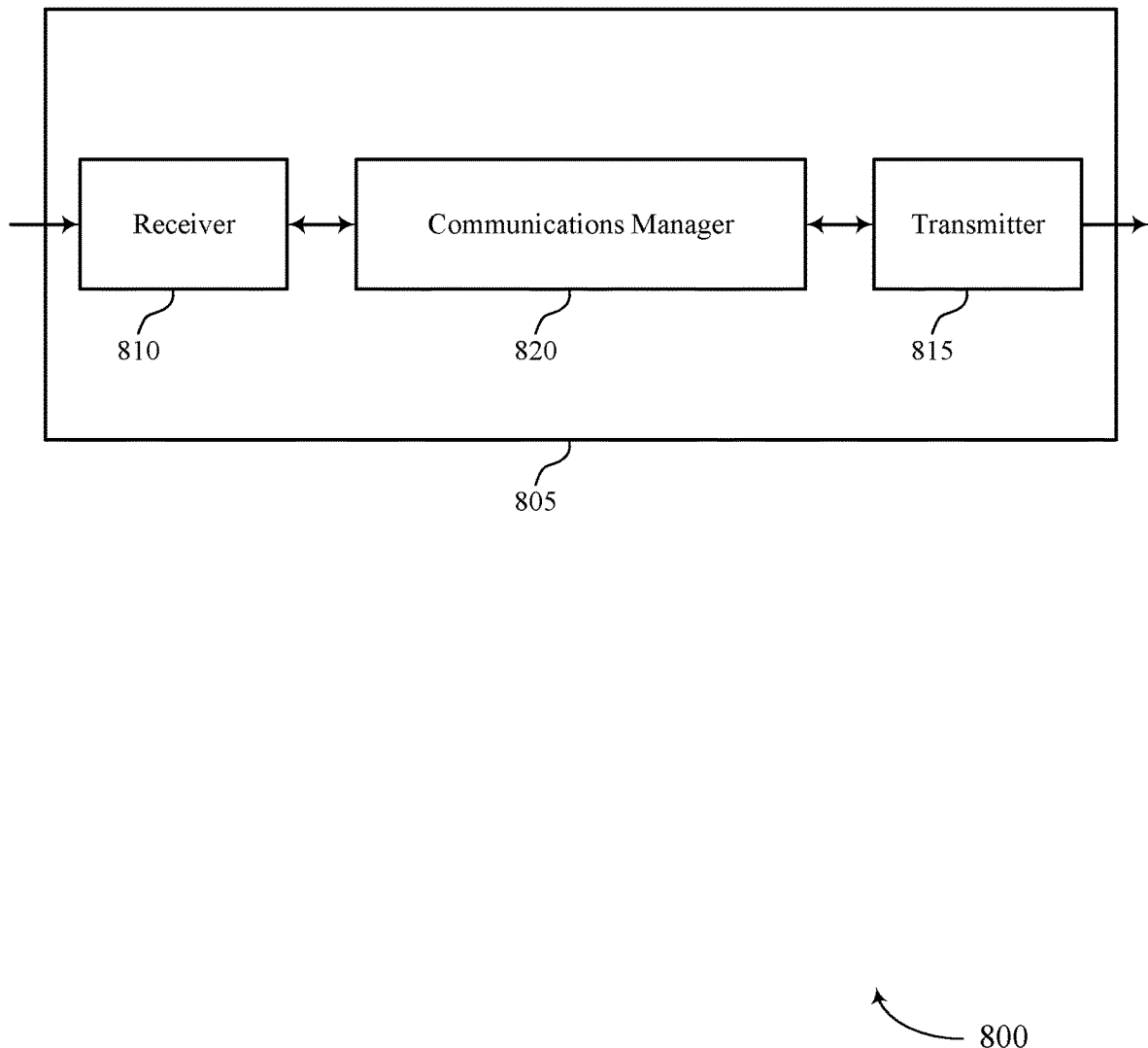
FIGS. 8 and 9 show block diagrams of devices that support aspects of the present disclosure.

FIG. 8 shows a block diagram 800 of a device 805 that supports dynamic reconfiguration of uplink control channel resources for a scheduling request in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic reconfiguration of uplink control channel resources for a scheduling request). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic reconfiguration of uplink control channel resources for a scheduling request). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of dynamic reconfiguration of uplink control channel resources for a scheduling request as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a first downlink control message indicating a set of parameters for a scheduling request for the UE. The communications manager 820 may be configured as or otherwise support a means for transmitting, to the UE using a first beam, a second downlink control message for the scheduling request, where one or both of the first downlink control message and the second downlink control message indicate uplink resources for the scheduling request and a transmission configuration indicator state. The communications manager 820 may be configured as or otherwise support a means for receiving, from the UE, the scheduling request on the uplink resources based on the set of parameters for the scheduling request.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for dynamically reconfiguring a PUCCH resource for a scheduling request and a TCI state through L1 signaling, which may improve reliability and resource efficiency and decrease latency among other advantages. As such, techniques described herein may promote network efficiencies by increasing scheduling request transmission speeds.

Figure 9:
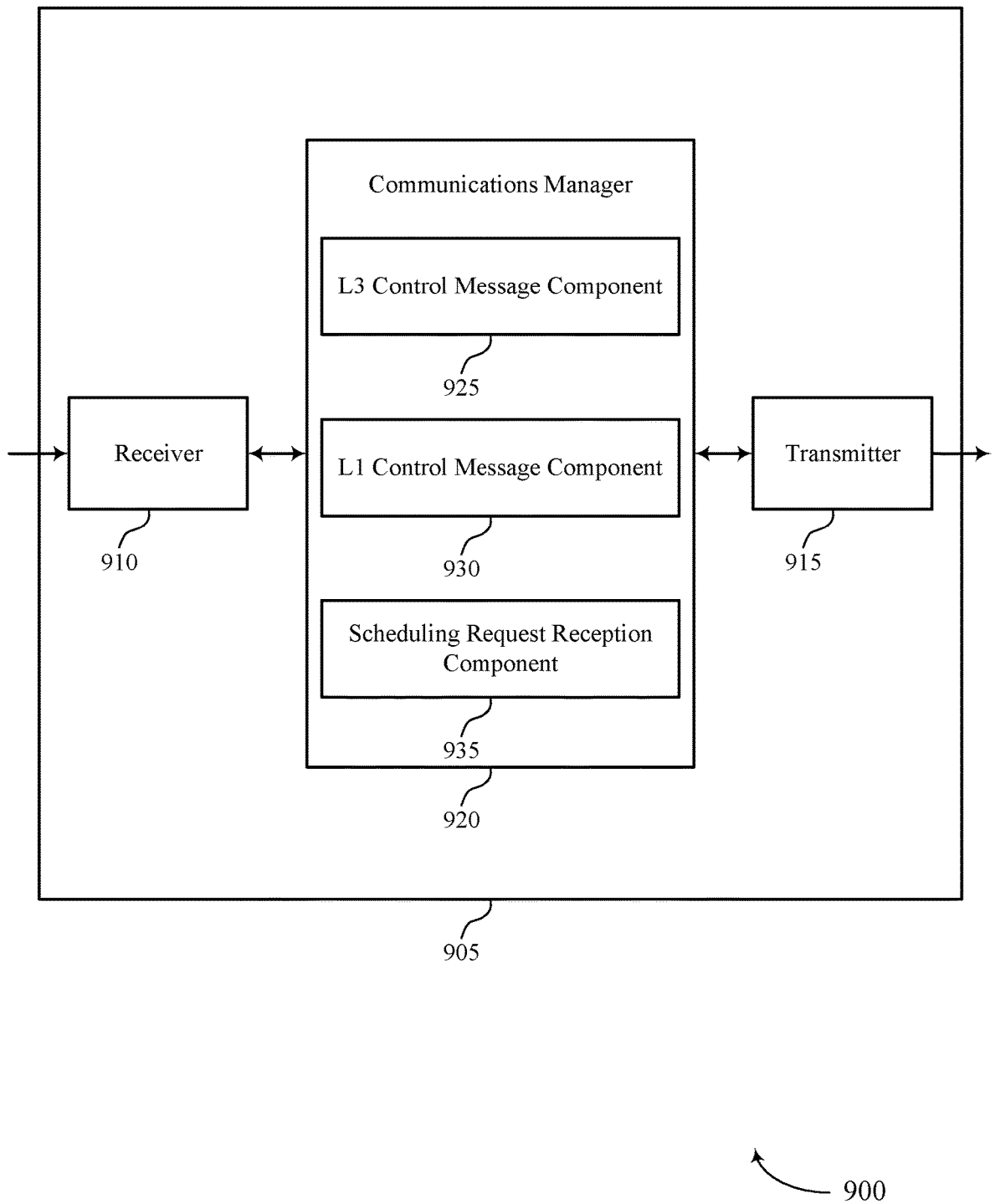

FIG. 9 shows a block diagram 900 of a device 905 that supports dynamic reconfiguration of uplink control channel resources for a scheduling request in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic reconfiguration of uplink control channel resources for a scheduling request). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic reconfiguration of uplink control channel resources for a scheduling request). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of dynamic reconfiguration of uplink control channel resources for a scheduling request as described herein. For example, the communications manager 920 may include a L3 control message component 925, a L1 control message component 930, a scheduling request reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The L3 control message component 925 may be configured as or otherwise support a means for transmitting, to a UE, a first downlink control message indicating a set of parameters for a scheduling request for the UE. The L1 control message component 930 may be configured as or otherwise support a means for transmitting, to the UE using a first beam, a second downlink control message for the scheduling request, where one or both of the first downlink control message and the second downlink control message indicate uplink resources for the scheduling request and a transmission configuration indicator state. The scheduling request reception component 935 may be configured as or otherwise support a means for receiving, from the UE, the scheduling request on the uplink resources based on the set of parameters for the scheduling request.

Figure 10:
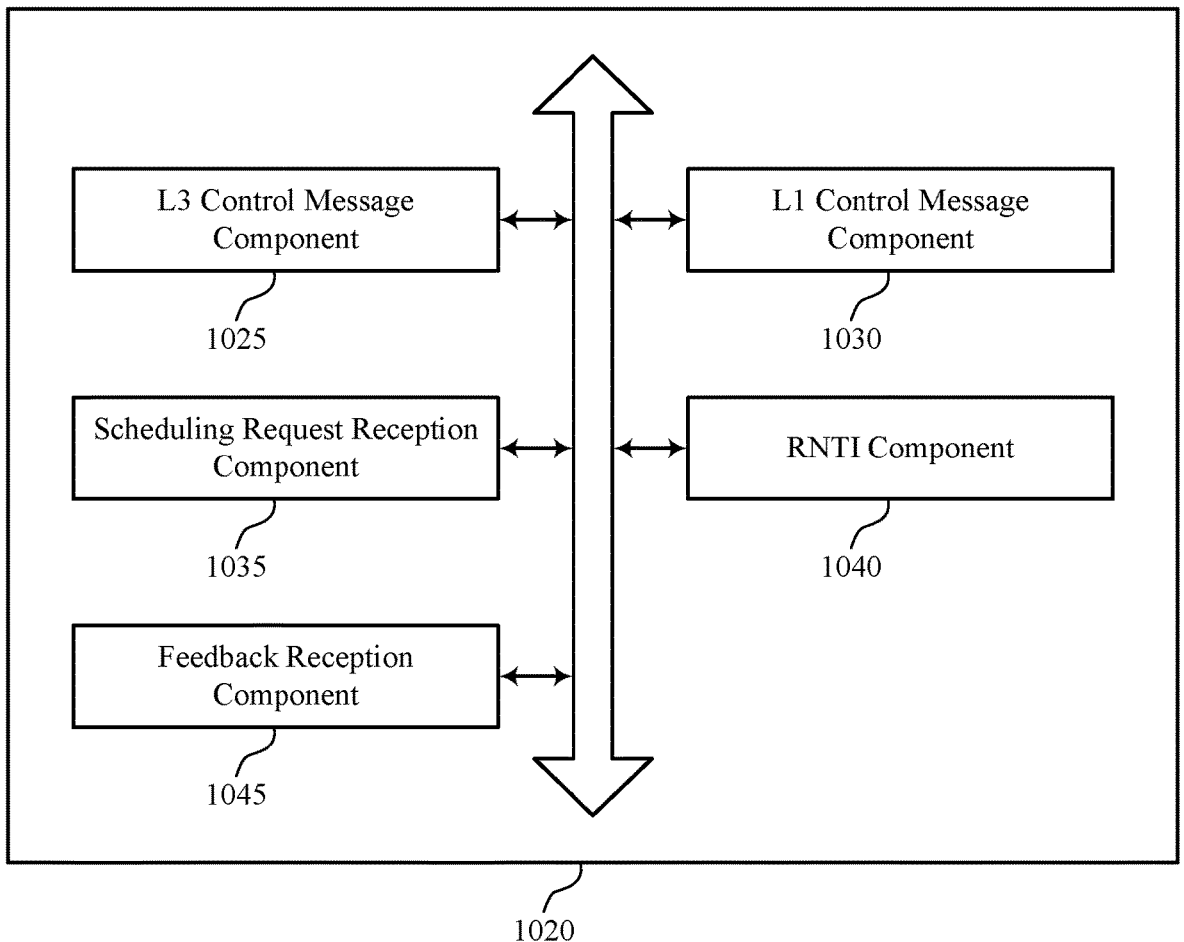
FIG. 10 shows a block diagram of a communications manager that supports aspects of the present disclosure.

FIG. 10 shows a block diagram 1000 of a communications manager 1020 that supports dynamic reconfiguration of uplink control channel resources for a scheduling request in accordance with aspects of the present disclosure. The communications manager 1020 may be an example of aspects of a communications manager 820, a communications manager 920, or both, as described herein. The communications manager 1020, or various components thereof, may be an example of means for performing various aspects of dynamic reconfiguration of uplink control channel resources for a scheduling request as described herein. For example, the communications manager 1020 may include a L3 control message component 1025, a L1 control message component 1030, a scheduling request reception component 1035, an RNTI component 1040, a feedback reception component 1045, or any combination thereof. Each of these components may communicate, directly or indirectly, with one another (e.g., via one or more buses).

The communications manager 1020 may support wireless communication at a base station in accordance with examples as disclosed herein. The L3 control message component 1025 may be configured as or otherwise support a means for transmitting, to a UE, a first downlink control message indicating a set of parameters for a scheduling request for the UE. The L1 control message component 1030 may be configured as or otherwise support a means for transmitting, to the UE using a first beam, a second downlink control message for the scheduling request, where one or both of the first downlink control message and the second downlink control message indicate uplink resources for the scheduling request and a transmission configuration indicator state. The scheduling request reception component 1035 may be configured as or otherwise support a means for receiving, from the UE, the scheduling request on the uplink resources based on the set of parameters for the scheduling request.

In some examples, to support transmitting the first downlink control message, the L3 control message component 1025 may be configured as or otherwise support a means for transmitting a layer 3 control message that configures a set of multiple configurations for the scheduling request, a set of multiple uplink resources including the uplink resources, and a set of multiple transmission configuration indicator states including the transmission configuration indicator state, where each of the set of multiple configurations is associated with one of the set of multiple uplink resources and one of the set of multiple transmission configuration indicator states.

In some examples, to support transmitting the second downlink control message, the L1 control message component 1030 may be configured as or otherwise support a means for transmitting a layer 1 control message that activates a configuration of the set of multiple configurations for the scheduling request, where the configuration is associated with the uplink resources and the transmission configuration indicator state.

In some examples, the layer 3 control message indicates, for each of the set of multiple uplink resources, a scheduling request uplink resource identifier, a number of symbols, a number of RBs, a starting symbol index, or any combination thereof.

In some examples, the layer 3 control message indicates, for each of the set of multiple configurations, a scheduling request identifier, a periodicity, an offset, a scheduling request timer, a number of maximum transmissions allowed for the scheduling request, or any combination thereof.

In some examples, to support transmitting the first downlink control message, the L3 control message component 1025 may be configured as or otherwise support a means for transmitting a layer 3 control message indicating a scheduling request identifier, a periodicity, an offset, a scheduling request timer, a number of maximum transmissions allowed for the scheduling request, or any combination thereof, for the scheduling request.

In some examples, to support transmitting the second downlink control message, the L1 control message component 1030 may be configured as or otherwise support a means for transmitting a layer 1 control message that includes the scheduling request identifier, an identifier for a set of uplink control channel resources, and an indicator for the transmission configuration indicator state, where the uplink resources include the set of uplink control channel resources.

In some examples, the identifier for the set of uplink control channel resources indicates a number of symbols, a number of RBs, a starting symbol index, or any combination thereof associated with the set of uplink control channel resources.

In some examples, to support transmitting the second downlink control message, the RNTI component 1040 may be configured as or otherwise support a means for transmitting the second downlink control message based on an RNTI unique to the scheduling request.

In some examples, to support transmitting the second downlink control message, the RNTI component 1040 may be configured as or otherwise support a means for transmitting the second downlink control message based on a CS-RNTI, where the second downlink control message includes one or more bits that indicate activation of a configuration for the scheduling request.

In some examples, the feedback reception component 1045 may be configured as or otherwise support a means for receiving feedback for the second downlink control message using the uplink resources indicated by the second downlink control message.

Figure 11:
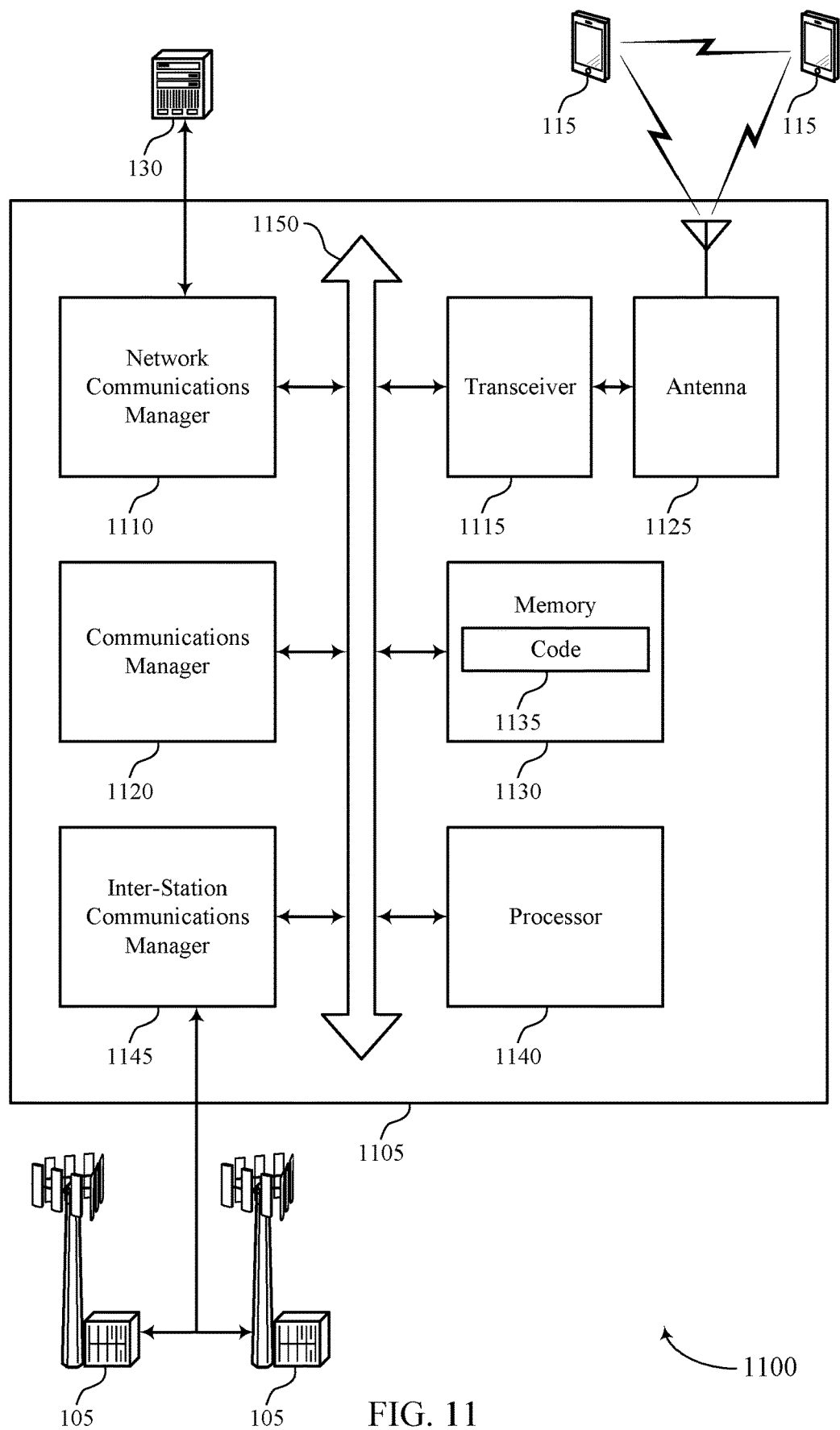
FIG. 11 shows a diagram of a system including a device that supports aspects of the present disclosure.

FIG. 11 shows a diagram of a system 1100 including a device 1105 that supports dynamic reconfiguration of uplink control channel resources for a scheduling request in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dynamic reconfiguration of uplink control channel resources for a scheduling request). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a first downlink control message indicating a set of parameters for a scheduling request for the UE. The communications manager 1120 may be configured as or otherwise support a means for transmitting, to the UE using a first beam, a second downlink control message for the scheduling request, where one or both of the first downlink control message and the second downlink control message indicate uplink resources for the scheduling request and a transmission configuration indicator state. The communications manager 1120 may be configured as or otherwise support a means for receiving, from the UE, the scheduling request on the uplink resources based on the set of parameters for the scheduling request.

By including or configuring the communications manager 1120 in accordance with examples as described herein, the device 1105 may support techniques for dynamically reconfiguring a PUCCH resource for a scheduling request and a TCI state through L1 signaling, which may improve reliability and resource efficiency and decrease latency among other advantages. As such, techniques described herein may promote network efficiencies by increasing scheduling request transmission speeds.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of dynamic reconfiguration of uplink control channel resources for a scheduling request as described herein, or the processor 1140 and the memory 1130 may be otherwise configured to perform or support such operations.

Figure 12:
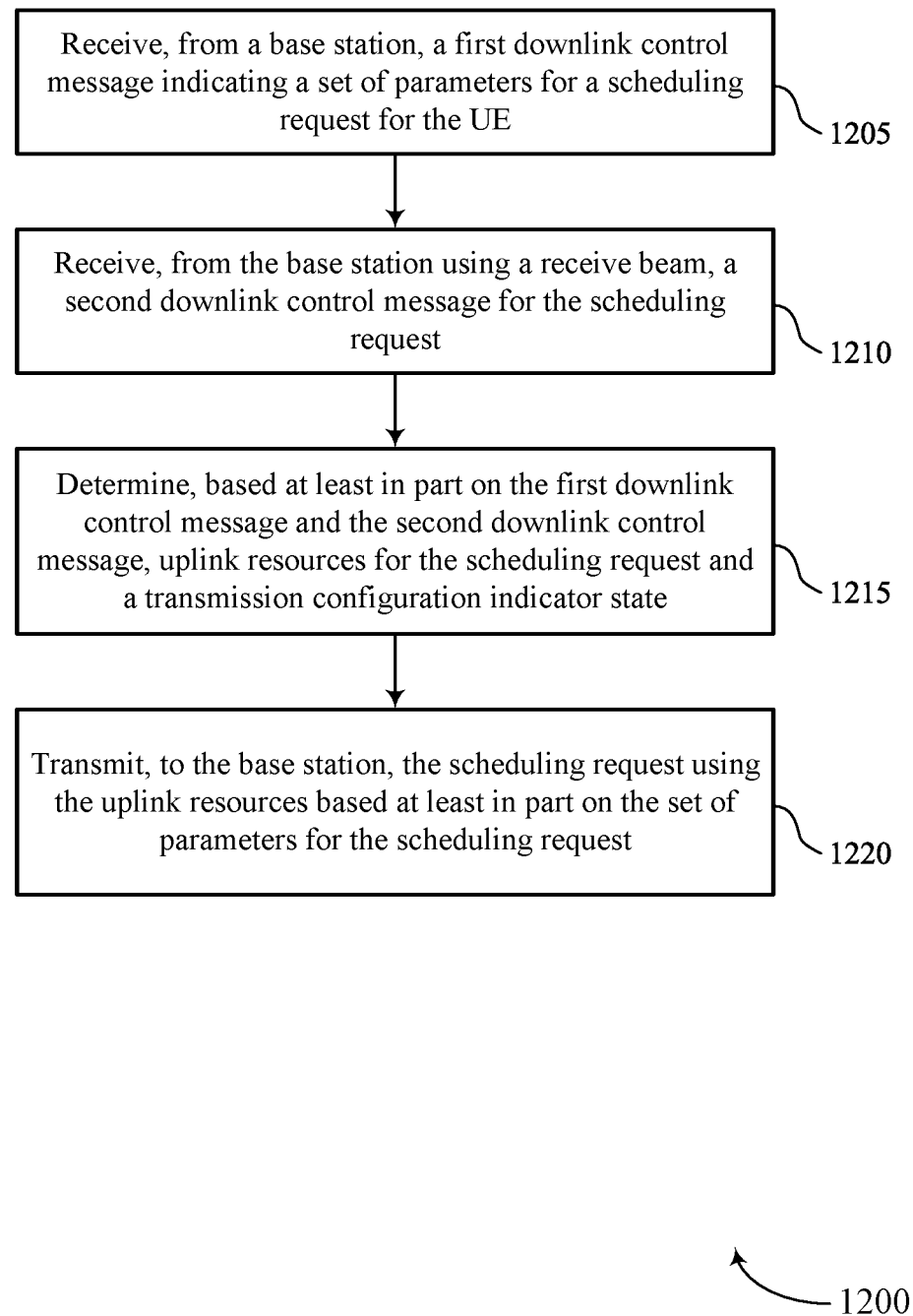
FIGS. 12 through 16 show flowcharts illustrating methods that support aspects of the present disclosure.

FIG. 12 shows a flowchart illustrating a method 1200 that supports dynamic reconfiguration of uplink control channel resources for a scheduling request in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a first downlink control message indicating a set of parameters for a scheduling request for the UE. The operations of 1205 may be performed in accordance with examples as disclosed herein. In some examples, aspects of the operations of 1205 may be performed by a L3 control message component 625 as described with reference to FIG. 6.

At 1210, the method may include receiving, from the base station using a receive beam, a second downlink control message for the scheduling request. The operations of 1210 may be performed in accordance with examples as disclosed herein. In some examples, aspects of the operations of 1210 may be performed by a L1 control message component 630 as described with reference to FIG. 6.

At 1215, the method may include determining, based on the first downlink control message and the second downlink control message, uplink resources for the scheduling request and a transmission configuration indicator state. The operations of 1215 may be performed in accordance with examples as disclosed herein. In some examples, aspects of the operations of 1215 may be performed by an uplink resource determining component 635 as described with reference to FIG. 6.

At 1220, the method may include transmitting, to the base station using the transmission configuration indicator state, the scheduling request using the uplink resources based on the set of parameters for the scheduling request. The operations of 1220 may be performed in accordance with examples as disclosed herein. In some examples, aspects of the operations of 1220 may be performed by a scheduling request transmission component 640 as described with reference to FIG. 6.

Figure 13:
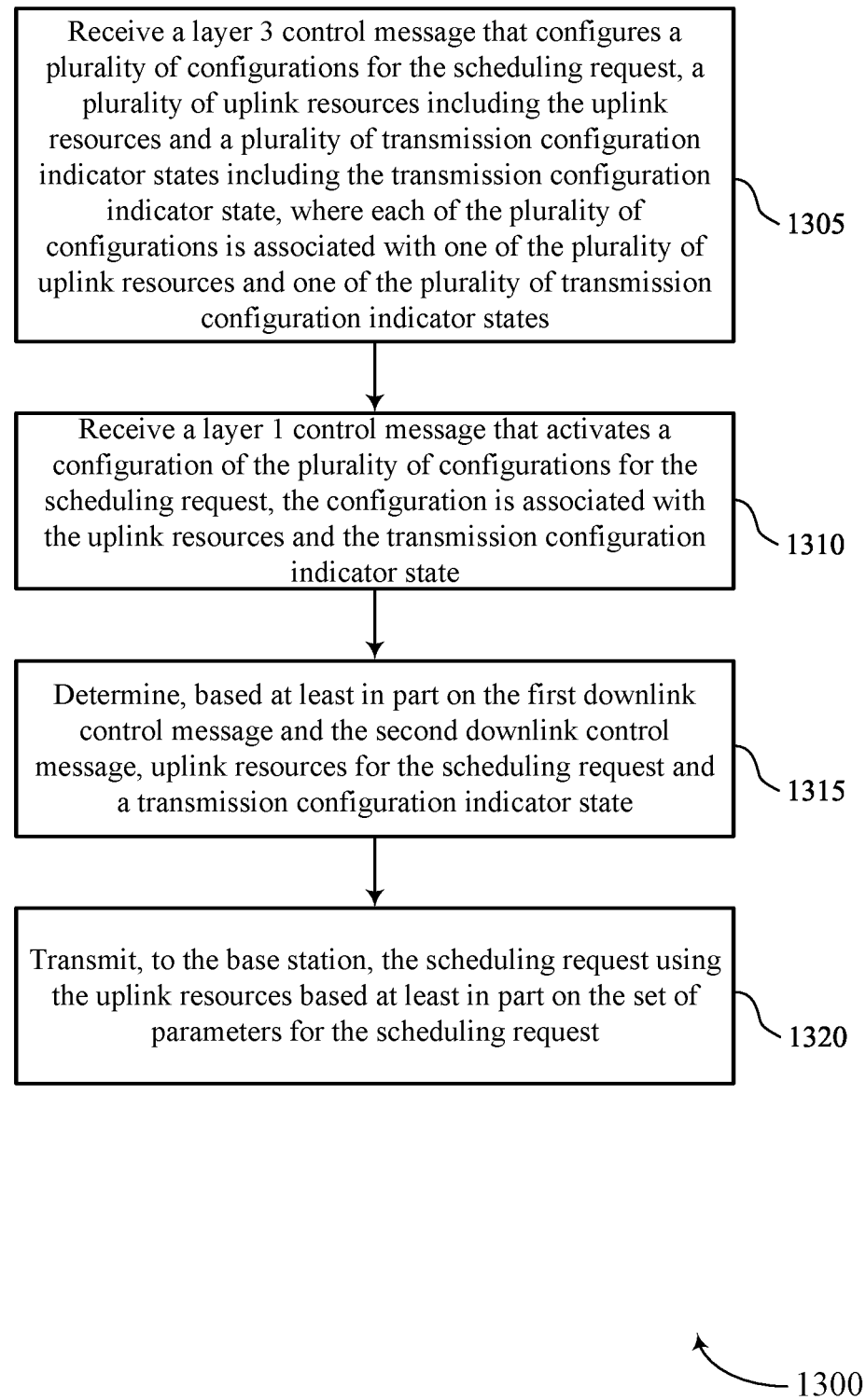

FIG. 13 shows a flowchart illustrating a method 1300 that supports dynamic reconfiguration of uplink control channel resources for a scheduling request in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving a layer 3 control message that configures a set of multiple configurations for the scheduling request, a set of multiple uplink resources including the uplink resources and a set of multiple transmission configuration indicator states including the transmission configuration indicator state, where each of the set of multiple configurations is associated with one of the set of multiple uplink resources and one of the set of multiple transmission configuration indicator states. The operations of 1305 may be performed in accordance with examples as disclosed herein. In some examples, aspects of the operations of 1305 may be performed by a L3 control message component 625 as described with reference to FIG. 6.

At 1310, the method may include receiving a layer 1 control message that activates a configuration of the set of multiple configurations for the scheduling request, where the configuration is associated with the uplink resources and the transmission configuration indicator state. The operations of 1310 may be performed in accordance with examples as disclosed herein. In some examples, aspects of the operations of 1310 may be performed by a L1 control message component 630 as described with reference to FIG. 6.

At 1315, the method may include determining, based on the first downlink control message and the second downlink control message, uplink resources for the scheduling request and a transmission configuration indicator state. The operations of 1315 may be performed in accordance with examples as disclosed herein. In some examples, aspects of the operations of 1315 may be performed by an uplink resource determining component 635 as described with reference to FIG. 6.

At 1320, the method may include transmitting, to the base station using the transmission configuration indicator state, the scheduling request using the uplink resources based on the set of parameters for the scheduling request. The operations of 1320 may be performed in accordance with examples as disclosed herein. In some examples, aspects of the operations of 1320 may be performed by a scheduling request transmission component 640 as described with reference to FIG. 6.

Figure 14:
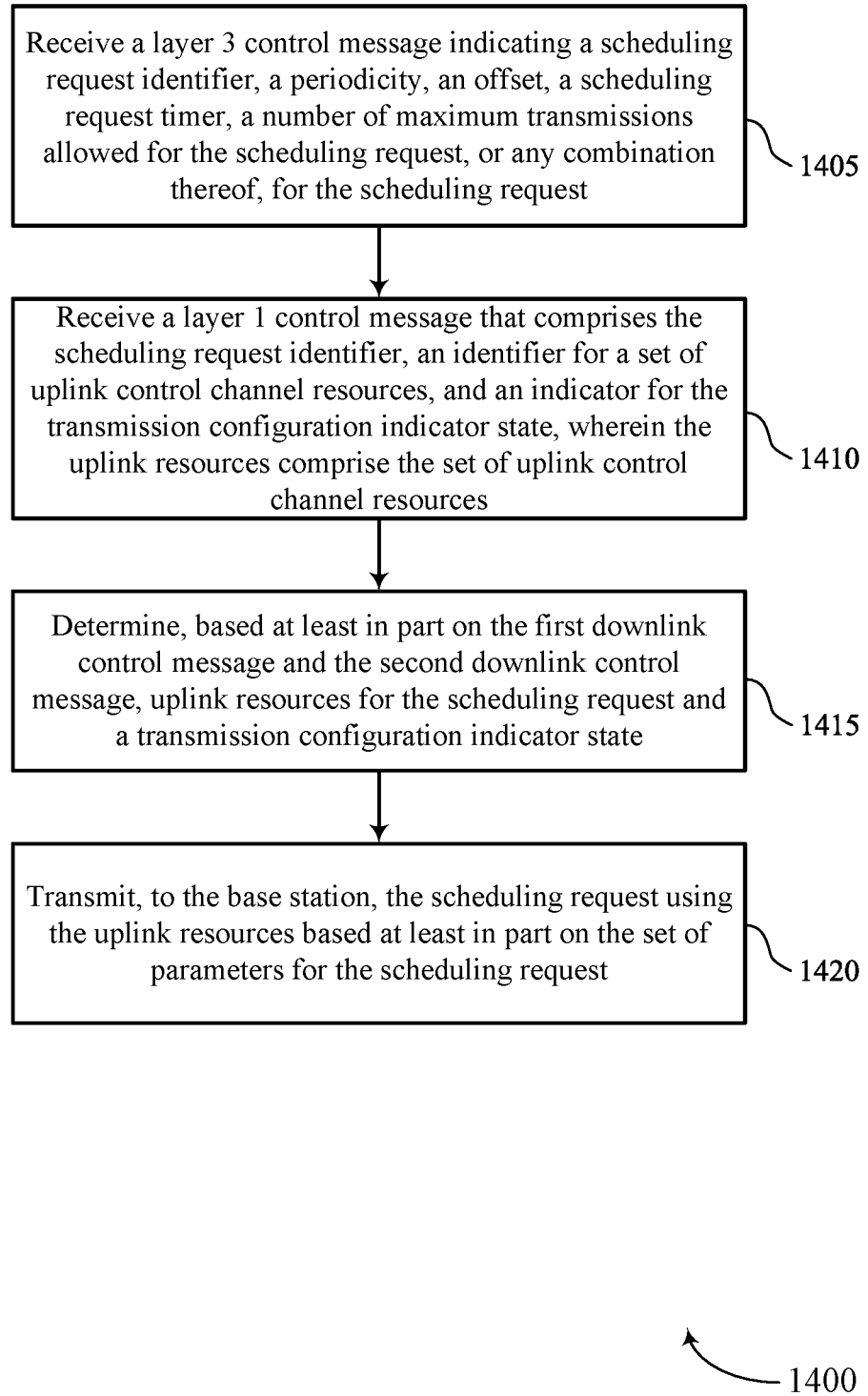

FIG. 14 shows a flowchart illustrating a method 1400 that supports dynamic reconfiguration of uplink control channel resources for a scheduling request in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving a layer 3 control message indicating a scheduling request identifier, a periodicity, an offset, a scheduling request timer, a number of maximum transmissions allowed for the scheduling request, or any combination thereof, for the scheduling request. The operations of 1405 may be performed in accordance with examples as disclosed herein. In some examples, aspects of the operations of 1405 may be performed by a L3 control message component 625 as described with reference to FIG. 6.

At 1410, the method may include receiving a layer 1 control message that includes the scheduling request identifier, an identifier for a set of uplink control channel resources, and an indicator for the transmission configuration indicator state, where the uplink resources include the set of uplink control channel resources. The operations of 1410 may be performed in accordance with examples as disclosed herein. In some examples, aspects of the operations of 1410 may be performed by a L1 control message component 630 as described with reference to FIG. 6.

At 1415, the method may include determining, based on the first downlink control message and the second downlink control message, uplink resources for the scheduling request and a transmission configuration indicator state. The operations of 1415 may be performed in accordance with examples as disclosed herein. In some examples, aspects of the operations of 1415 may be performed by an uplink resource determining component 635 as described with reference to FIG. 6.

At 1420, the method may include transmitting, to the base station using the transmission configuration indicator state, the scheduling request using the uplink resources based on the set of parameters for the scheduling request. The operations of 1420 may be performed in accordance with examples as disclosed herein. In some examples, aspects of the operations of 1420 may be performed by a scheduling request transmission component 640 as described with reference to FIG. 6.

Figure 15:
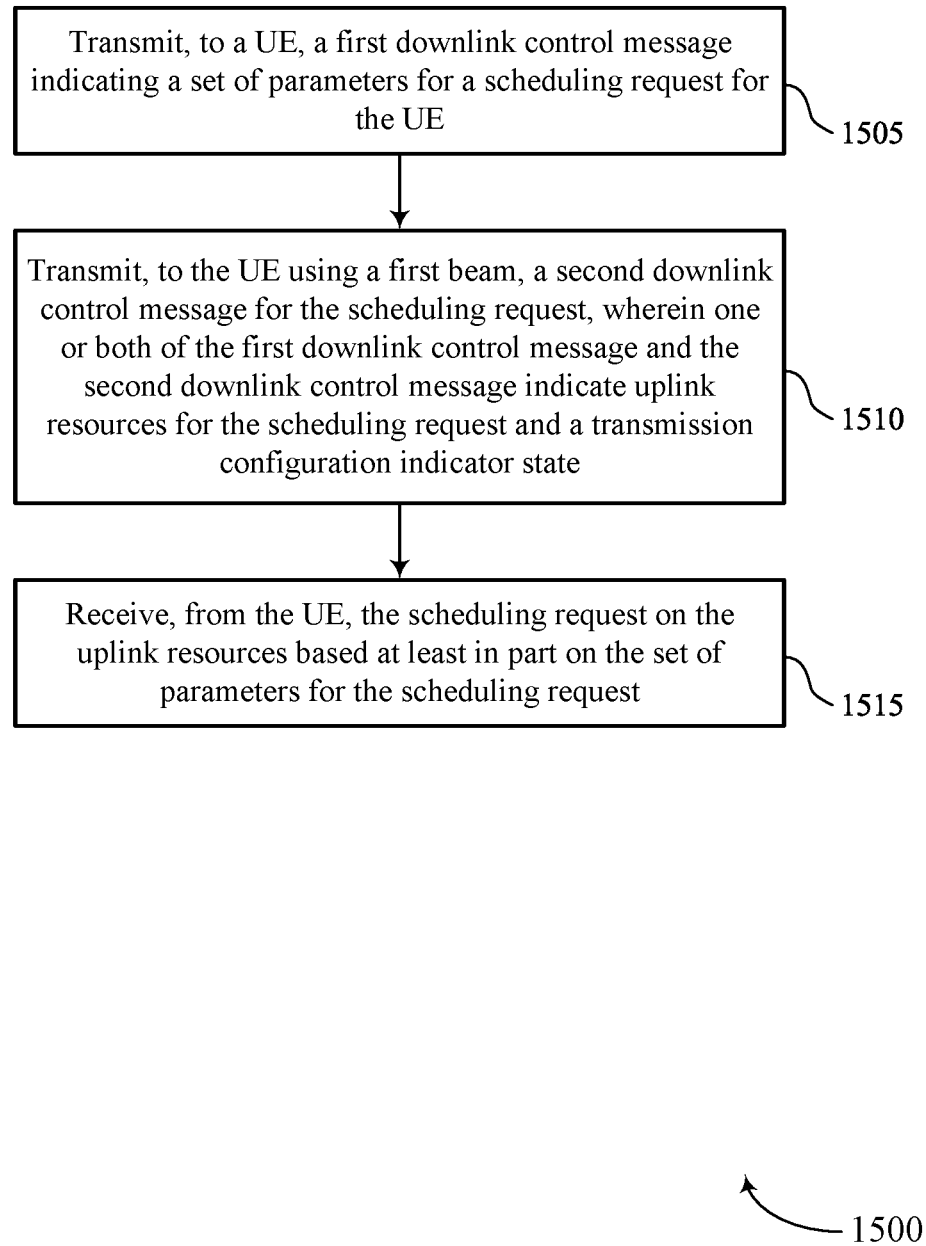

FIG. 15 shows a flowchart illustrating a method 1500 that supports dynamic reconfiguration of uplink control channel resources for a scheduling request in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a first downlink control message indicating a set of parameters for a scheduling request for the UE. The operations of 1505 may be performed in accordance with examples as disclosed herein. In some examples, aspects of the operations of 1505 may be performed by a L3 control message component 1025 as described with reference to FIG. 10.

At 1510, the method may include transmitting, to the UE using a first beam, a second downlink control message for the scheduling request, where one or both of the first downlink control message and the second downlink control message indicate uplink resources for the scheduling request and a transmission configuration indicator state. The operations of 1510 may be performed in accordance with examples as disclosed herein. In some examples, aspects of the operations of 1510 may be performed by a L1 control message component 1030 as described with reference to FIG. 10.

At 1515, the method may include receiving, from the UE, the scheduling request on the uplink resources based on the set of parameters for the scheduling request. The operations of 1515 may be performed in accordance with examples as disclosed herein. In some examples, aspects of the operations of 1515 may be performed by a scheduling request reception component 1035 as described with reference to FIG. 10.

Figure 16:
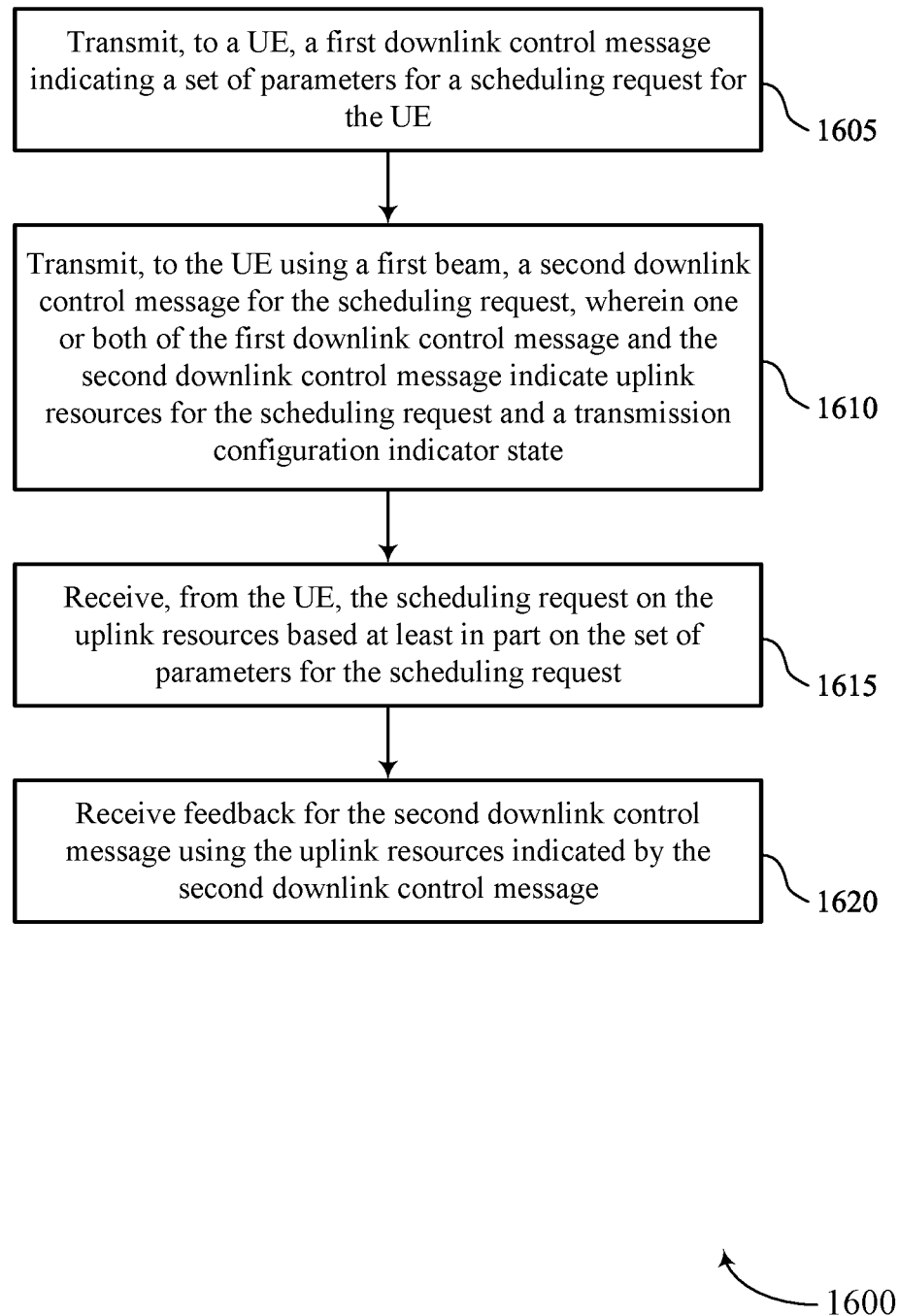

FIG. 16 shows a flowchart illustrating a method 1600 that supports dynamic reconfiguration of uplink control channel resources for a scheduling request in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a first downlink control message indicating a set of parameters for a scheduling request for the UE. The operations of 1605 may be performed in accordance with examples as disclosed herein. In some examples, aspects of the operations of 1605 may be performed by a L3 control message component 1025 as described with reference to FIG. 10.

At 1610, the method may include transmitting, to the UE using a first beam, a second downlink control message for the scheduling request, where one or both of the first downlink control message and the second downlink control message indicate uplink resources for the scheduling request and a transmission configuration indicator state. The operations of 1610 may be performed in accordance with examples as disclosed herein. In some examples, aspects of the operations of 1610 may be performed by a L1 control message component 1030 as described with reference to FIG. 10.

At 1615, the method may include receiving, from the UE, the scheduling request on the uplink resources based on the set of parameters for the scheduling request. The operations of 1615 may be performed in accordance with examples as disclosed herein. In some examples, aspects of the operations of 1615 may be performed by a scheduling request reception component 1035 as described with reference to FIG. 10.

At 1620, the method may include receiving feedback for the second downlink control message using the uplink resources indicated by the second downlink control message. The operations of 1620 may be performed in accordance with examples as disclosed herein. In some examples, aspects of the operations of 1620 may be performed by a feedback reception component 1045 as described with reference to FIG. 10.

The following provides an overview of aspects of the present disclosure:

Aspect 1: A method for wireless communication at a UE, comprising: receiving, from a base station, a first downlink control message indicating a set of parameters for a scheduling request for the UE; receiving, from the base station using a receive beam, a second downlink control message for the scheduling request; determining, based at least in part on the first downlink control message and the second downlink control message, uplink resources for the scheduling request and a transmission configuration indicator state; and transmitting, to the base station using the transmission configuration indicator state, the scheduling request using the uplink resources based at least in part on the set of parameters for the scheduling request.

Aspect 2: The method of aspect 1, wherein receiving the first downlink control message comprises: receiving a layer 3 control message that configures a plurality of configurations for the scheduling request, a plurality of uplink resources including the uplink resources and a plurality of transmission configuration indicator states including the second transmission configuration indicator state; each of the plurality of configurations is associated with one of the plurality of uplink resources and one of the plurality of transmission configuration indicator states.

Aspect 3: The method of aspect 2, wherein receiving the second downlink control message comprises: receiving a layer 1 control message that activates a configuration of the plurality of configurations for the scheduling request, the configuration is associated with the uplink resources and the second transmission configuration indicator state.

Aspect 4: The method of any of aspects 2 through 3, wherein the layer 3 control message indicates, for each of the plurality of uplink resources, a scheduling request uplink resource identifier, a number of symbols, a number of resource blocks, a starting symbol index, or any combination thereof.

Aspect 5: The method of any of aspects 2 through 4, wherein the layer 3 control message indicates, for each of the plurality of configurations, a scheduling request identifier, a periodicity, an offset, a scheduling request timer, a number of maximum transmissions allowed for the scheduling request, or any combination thereof.

Aspect 6: The method of any of aspects 1 through 5, wherein receiving the first downlink control message comprises: receiving a layer 3 control message indicating a scheduling request identifier, a periodicity, an offset, a scheduling request timer, a number of maximum transmissions allowed for the scheduling request, or any combination thereof, for configuration for the scheduling request.

Aspect 7: The method of aspect 6, wherein receiving the second downlink control message comprises: receiving a layer 1 control message that comprises the scheduling request identifier, an identifier for a set of uplink control channel resources, and the second transmission configuration indicator state wherein the uplink resources comprise the set of uplink control channel resources.

Aspect 8: The method of aspect 7, wherein the identifier for the set of uplink control channel resources indicates a number of symbols, a number of resource blocks, a starting symbol index, or any combination thereof associated with the set of uplink control channel resources.

Aspect 9: The method of any of aspects 1 through 8, wherein receiving the second downlink control message comprises: decoding the second downlink control message based at least in part on a radio network temporary identifier unique to the scheduling request.

Aspect 10: The method of any of aspects 1 through 9, wherein receiving the second downlink control message comprises: decoding the second downlink control message based at least in part on a configured scheduling (CS) radio network temporary identifier, wherein the second downlink control message includes one or more bits that indicate activation of a configuration for the scheduling request.

Aspect 11: The method of any of aspects 1 through 10, further comprising: transmitting feedback for the second downlink control message using the uplink resources indicated by the second downlink control message.

Aspect 12: A method for wireless communication at a base station, comprising: transmitting, to a UE, a first downlink control message indicating a set of parameters for a scheduling request for the UE; transmitting, to the UE using a first beam, a second downlink control message for the scheduling request, wherein one or both of the first downlink control message and the second downlink control message indicate uplink resources for the scheduling request and a second transmission configuration indicator state; and receiving, from the UE, the scheduling request on the uplink resources based at least in part on the set of parameters for the scheduling request.

Aspect 13: The method of aspect 12, wherein transmitting the first downlink control message comprises: transmitting a layer 3 control message that configures a plurality of configurations for the scheduling request, a plurality of uplink resources including the uplink resources and a plurality of transmission configuration indicator states including the second transmission configuration indicator state; each of the plurality of configurations is associated with one of the plurality of uplink resources and one of the plurality of transmission configuration indicator states.

Aspect 14: The method of aspect 13, wherein transmitting the second downlink control message comprises: transmitting a layer 1 control message that activates a configuration of the plurality of configurations for the scheduling request, the configuration is associated with the uplink resources and the second transmission configuration indicator state.

Aspect 15: The method of any of aspects 13 through 14, wherein the layer 3 control message indicates, for each of the plurality of uplink resources, a scheduling request uplink resource identifier, a number of symbols, a number of resource blocks, a starting symbol index, or any combination thereof.

Aspect 16: The method of any of aspects 13 through 15, wherein the layer 3 control message indicates, for each of the plurality of configurations, a scheduling request identifier, a periodicity, an offset, a scheduling request timer, a number of maximum transmissions allowed for the scheduling request, or any combination thereof.

Aspect 17: The method of any of aspects 12 through 16, wherein transmitting the first downlink control message comprises: transmitting a layer 3 control message indicating a scheduling request identifier, a periodicity, an offset, a scheduling request timer, a number of maximum transmissions allowed for the scheduling request, or any combination thereof, for configuration for the scheduling request.

Aspect 18: The method of aspect 17, wherein transmitting the second downlink control message comprises: transmitting a layer 1 control message that comprises the scheduling request identifier, an identifier for a set of uplink control channel resources, and the second transmission configuration indicator state, wherein the uplink resources comprise the set of uplink control channel resources.

Aspect 19: The method of aspect 18, wherein the identifier for the set of uplink control channel resources indicates a number of symbols, a number of resource blocks, a starting symbol index, or any combination thereof associated with the set of uplink control channel resources.

Aspect 20: The method of any of aspects 12 through 19, wherein transmitting the second downlink control message comprises: transmitting the second downlink control message based at least in part on a radio network temporary identifier unique to the scheduling request.

Aspect 21: The method of any of aspects 12 through 20, wherein transmitting the second downlink control message comprises: transmitting the second downlink control message based at least in part on a configured scheduling (CS) radio network temporary identifier, wherein the second downlink control message includes one or more bits that indicate activation of a configuration for the scheduling request.

Aspect 22: The method of any of aspects 12 through 21, further comprising: receiving feedback for the second downlink control message using the uplink resources indicated by the second downlink control message.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a layer 3 downlink control message indicating a set of parameters for a scheduling request for the UE;
    receiving a layer 1 downlink control message indicating one or more uplink resources of a plurality of uplink resources available for the scheduling request, the one or more uplink resources based at least in part on the set of parameters; and
    transmitting the scheduling request using the one or more uplink resources and using a transmission configuration indicator state corresponding to the scheduling request, the transmission configuration indicator state being based at least in part on the set of parameters indicated by the layer 3 downlink control message and on the one or more uplink resources indicated by the layer 1 downlink control message,
    wherein the layer 3 downlink control message configures a plurality of configurations for the scheduling request, the plurality of uplink resources including the one or more uplink resources, and a plurality of transmission configuration indicator states including the transmission configuration indicator state, wherein each of the plurality of configurations is associated with one of the plurality of uplink resources and one of the plurality of transmission configuration indicator states.

2. The method of claim 1, wherein layer 1 downlink control message
    activates a configuration of the plurality of configurations for the scheduling request, wherein the configuration is associated with the one or more uplink resources and the transmission configuration indicator state.

3. The method of claim 1, wherein the layer 3 downlink control message indicates, for each of the plurality of uplink resources, a scheduling request uplink resource identifier, a number of symbols, a number of resource blocks, a starting symbol index, or any combination thereof.

4. The method of claim 1, wherein the layer 3 downlink control message indicates, for each of the plurality of configurations, a scheduling request identifier, a periodicity, an offset, a scheduling request timer, a number of maximum transmissions allowed for the scheduling request, or any combination thereof.

5. The method of claim 1, wherein the layer 3 downlink control message indicates
    a scheduling request identifier, a periodicity, an offset, a scheduling request timer, a number of maximum transmissions allowed for the scheduling request, or any combination thereof, for the scheduling request.

6. The method of claim 5, wherein the layer 1 downlink control message
    comprises the scheduling request identifier, an identifier for a set of uplink control channel resources, and the transmission configuration indicator state, wherein the one or more uplink resources comprise the set of uplink control channel resources.

7. The method of claim 6, wherein the identifier for the set of uplink control channel resources indicates a number of symbols, a number of resource blocks, a starting symbol index, or any combination thereof associated with the set of uplink control channel resources.

8. The method of claim 1, wherein receiving the layer 1 downlink control message comprises:
decoding the layer 1 downlink control message based at least in part on a radio network temporary identifier unique to the scheduling request.

9. The method of claim 1, wherein receiving the layer 1 downlink control message comprises:
decoding the layer 1 downlink control message based at least in part on a configured scheduling (CS) radio network temporary identifier, wherein the layer 1 downlink control message includes one or more bits that indicate activation of a configuration for the scheduling request.

10. The method of claim 1, further comprising:
transmitting feedback for the layer 1 downlink control message using the one or more uplink resources indicated by the layer 1 downlink control message.

11. A method for wireless communication at a base station, comprising:
transmitting a layer 3 downlink control message indicating a set of parameters for a scheduling request for a user equipment (UE);
transmitting a layer 1 downlink control message indicating one or more uplink resources of a plurality of uplink resources available for the scheduling request, the one or more uplink resources based at least in part on the set of parameters; and
receiving the scheduling request via the one or more uplink resources based at least in part on a transmission configuration indicator state corresponding to the scheduling request, the transmission configuration indicator state being based at least in part on the set of parameters indicated by the layer 3 downlink control message and on the one or more uplink resources indicated by the layer 1 downlink control message,
wherein the layer 3 downlink control message configures a plurality of configurations for the scheduling request, the plurality of uplink resources including the one or more uplink resources, and a plurality of transmission configuration indicator states including the transmission configuration indicator state, wherein each of the plurality of configurations is associated with one of the plurality of uplink resources and one of the plurality of transmission configuration indicator states.

12. The method of claim 11, wherein the layer 1 downlink control message
activates a configuration of the plurality of configurations for the scheduling request, wherein the configuration is associated with the one or more uplink resources and the transmission configuration indicator state.

13. The method of claim 11, wherein the layer 3 downlink control message indicates, for each of the plurality of uplink resources, a scheduling request uplink resource identifier, a number of symbols, a number of resource blocks, a starting symbol index, or any combination thereof.

14. The method of claim 11, wherein the layer 3 downlink control message indicates, for each of the plurality of configurations, a scheduling request identifier, a periodicity, an offset, a scheduling request timer, a number of maximum transmissions allowed for the scheduling request, or any combination thereof.

15. The method of claim 11, wherein the layer 3 downlink control message indicates
a scheduling request identifier, a periodicity, an offset, a scheduling request timer, a number of maximum transmissions allowed for the scheduling request, or any combination thereof, for the scheduling request.

16. The method of claim 15, wherein the layer 1 downlink control message
comprises the scheduling request identifier, an identifier for a set of uplink control channel resources, and the transmission configuration indicator state, wherein the one or more uplink resources comprise the set of uplink control channel resources.

17. The method of claim 16, wherein the identifier for the set of uplink control channel resources indicates a number of symbols, a number of resource blocks, a starting symbol index, or any combination thereof, associated with the set of uplink control channel resources.

18. The method of claim 11, wherein transmitting the layer 1 downlink control message comprises:
transmitting the layer 1 downlink control message based at least in part on a radio network temporary identifier unique to the scheduling request.

19. The method of claim 11, wherein transmitting the layer 1 downlink control message comprises:
transmitting the layer 1 downlink control message based at least in part on a configured scheduling (CS) radio network temporary identifier, wherein the layer 1 downlink control message includes one or more bits that indicate activation of a configuration for the scheduling request.

20. The method of claim 11, further comprising:
receiving feedback for the layer 1 downlink control message using the one or more uplink resources indicated by the layer 1 downlink control message.

21. An apparatus for wireless communication at a user equipment (UE), comprising:
one or more processors;
memory coupled with the one or more processors; and
instructions stored in the memory and executable by the one or more processors to cause the apparatus to:
receive a layer 3 downlink control message indicating a set of parameters for a scheduling request for the UE;
receive a layer 1 downlink control message indicating one or more uplink resources of a plurality of uplink resources available for the scheduling request, the one or more uplink resources based at least in part on the set of parameters; and
transmit the scheduling request using the one or more uplink resources and using a transmission configuration indicator state corresponding to the scheduling request, the transmission configuration indicator state being based at least in part on the set of parameters indicated by the layer 3 downlink control message and on the one or more uplink resources indicated by the layer 1 downlink control message,
wherein the layer 3 downlink control message configures a plurality of configurations for the scheduling request, the plurality of uplink resources including the one or more uplink resources, and a plurality of transmission configuration indicator states including the transmission configuration indicator state, where each of the plurality of configurations is associated with one of the plurality of uplink resources and one of the plurality of transmission configuration indicator states.

22. The apparatus of claim 21, wherein the layer 1 downlink control message
activates a configuration of the plurality of configurations for the scheduling request, wherein the configuration is associated with the one or more uplink resources and the transmission configuration indicator state.

23. The apparatus of claim 21, wherein the instructions are further executable by the one or more processors to cause the apparatus to:
transmit feedback for the layer 1 downlink control message using the one or more uplink resources indicated by the layer 1 downlink control message.

24. An apparatus for wireless communication at a base station, comprising:
one or more processors;
memory coupled with the one or more processors; and
instructions stored in the memory and executable by the one or more processors to cause the apparatus to:
transmit a layer 3 downlink control message indicating a set of parameters for a scheduling request for a user equipment (UE);
transmit a layer 1 downlink control message indicating one or more uplink resources of a plurality of uplink resources available for the scheduling request, the one or more uplink resources based at least in part on the set of parameters; and
receive the scheduling request via the one or more uplink resources and based at least in part on a transmission configuration indicator state corresponding to the scheduling request, the transmission configuration indicator state being based at least in part on the set of parameters indicated by the layer 3 downlink control message and on the one or more uplink resources indicated by the layer 1 downlink control message,
wherein the layer 3 downlink control message configures a plurality of configurations for the scheduling request, the plurality of uplink resources including the one or more uplink resources, and a plurality of transmission configuration indicator states including the transmission configuration indicator state, wherein each of the plurality of configurations is associated with one of the plurality of uplink resources and one of the plurality of transmission configuration indicator states.

25. The apparatus of claim 24, wherein the layer 1 downlink control message
activates a configuration of the plurality of configurations for the scheduling request, wherein the configuration is associated with the one or more uplink resources and the transmission configuration indicator state.

26. The apparatus of claim 24, wherein the instructions are further executable by the one or more processors to cause the apparatus to:
receive feedback for the layer 1 downlink control message using the one or more uplink resources indicated by the layer 1 downlink control message.

\* \* \* \* \*